(12) United States Patent
Wagner et al.

(10) Patent No.: US 10,913,614 B2
(45) Date of Patent: *Feb. 9, 2021

(54) SYSTEMS AND METHODS FOR PROVIDING SINGULATION OF OBJECTS FOR PROCESSING

(71) Applicant: Berkshire Grey, Inc., Lexington, MA (US)

(72) Inventors: Thomas Wagner, Concord, MA (US); Kevin Ahearn, Fort Mill, SC (US); Benjamin Cohen, Somerville, MA (US); Michael Dawson-Haggerty, Pittsburgh, PA (US); Christopher Geyer, Arlington, MA (US); Thomas Koletschka, Cambridge, MA (US); Kyle Maroney, North Attleboro, MA (US); Matthew T. Mason, Pittsburgh, PA (US); Gene Temple Price, Cambridge, MA (US); Joseph Romano, San Jose, CA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey, Inc., Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/703,540

(22) Filed: Dec. 4, 2019

(65) Prior Publication Data

US 2020/0109012 A1 Apr. 9, 2020

Related U.S. Application Data

(63) Continuation of application No. 15/824,009, filed on Nov. 28, 2017, now Pat. No. 10,538,394.

(Continued)

(51) Int. Cl.
*B65G 47/49* (2006.01)
*B65G 47/256* (2006.01)
(Continued)

(52) U.S. Cl.
CPC .............. *B65G 47/49* (2013.01); *B65G 47/12* (2013.01); *B65G 47/22* (2013.01); *B65G 47/256* (2013.01);
(Continued)

(58) Field of Classification Search
CPC ...... B65G 47/902; B65G 47/82; B65G 47/49; B65G 47/44; B65G 47/22; B65G 47/256;
(Continued)

(56) References Cited

U.S. PATENT DOCUMENTS 3,592,326 A 7/1971 Zimmerle et al.
3,734,286 A 5/1973 Simjian
(Continued)

FOREIGN PATENT DOCUMENTS

AU 2006204622 A1 3/2007
CN 102040092 A 5/2011
(Continued)

OTHER PUBLICATIONS

International Preliminary Report on Patentability dated Oct. 29, 2019 in related PCT Application No. PCT/US2018/029114, 9 pages.
(Continued)

*Primary Examiner* — Mark A Deuble
(74) *Attorney, Agent, or Firm* — Gesmer Updegrove LLP

(57) ABSTRACT

A processing system including a singulation system is disclosed. The singulation system includes a conveying system for moving objects to be sorted from a source area along a first direction, a detection system for detecting objects at the conveying system, and for selecting certain selected objects for removal from the conveying system, and
(Continued)

a removal system for removing the certain selected objects from the conveying system for providing a singulated stream of objects.

36 Claims, 19 Drawing Sheets

Related U.S. Application Data

(60) Provisional application No. 62/426,913, filed on Nov. 28, 2016.

(51) Int. Cl.
    *B65G 47/22*     (2006.01)
    *B65G 47/12*     (2006.01)
    *B65G 47/44*     (2006.01)
    *B65G 47/82*     (2006.01)
    *B65G 47/90*     (2006.01)

(52) U.S. Cl.
    CPC ............. *B65G 47/44* (2013.01); *B65G 47/82* (2013.01); *B65G 47/902* (2013.01); *B65G 2201/0285* (2013.01); *B65G 2203/044* (2013.01); *B65G 2203/046* (2013.01)

(58) Field of Classification Search
    CPC ...... B65G 2203/044; B65G 2201/0285; B65G 2203/046; B65G 47/26; B65G 47/30; B65G 47/48
    See application file for complete search history.

(56) References Cited

U.S. PATENT DOCUMENTS

| | | | |
|---|---|---|---|
| 4,073,375 A | 2/1978 | Hart et al. |
| 4,186,836 A | 2/1980 | Wassmer et al. |
| 4,244,459 A | 1/1981 | Garrett |
| 4,360,098 A | 11/1982 | Nordstrom |
| 4,722,653 A | 2/1988 | Williams et al. |
| 4,759,439 A | 7/1988 | Hartlepp |
| 4,819,784 A | 4/1989 | Sticht |
| 4,846,335 A | 7/1989 | Hartlepp |
| 4,895,242 A | 1/1990 | Michel |
| 5,082,103 A | 1/1992 | Ross et al. |
| 5,097,939 A | 3/1992 | Shanklin et al. |
| 5,190,162 A | 3/1993 | Hartlepp |
| 5,419,457 A | 5/1995 | Ross et al. |
| 5,460,271 A | 10/1995 | Kenny et al. |
| 5,495,097 A | 2/1996 | Katz et al. |
| 5,628,408 A | 5/1997 | Planke et al. |
| 5,713,473 A | 2/1998 | Satake et al. |
| 5,794,788 A | 8/1998 | Massen |
| 5,839,566 A | 11/1998 | Bonnet |
| 5,875,434 A | 2/1999 | Matsuoka et al. |
| 6,011,998 A | 1/2000 | Lichti et al. |
| 6,059,092 A | 5/2000 | Jerue et al. |
| 6,060,677 A | 5/2000 | Ulrichsen et al. |
| 6,079,570 A | 6/2000 | Oppliger et al. |
| 6,087,608 A | 7/2000 | Schlichter et al. |
| 6,131,372 A | 10/2000 | Pruett |
| 6,208,908 B1 | 3/2001 | Boyd et al. |
| 6,246,023 B1 | 6/2001 | Kugle |
| 6,323,452 B1 | 11/2001 | Bonnet |
| 6,401,936 B1 | 6/2002 | Isaacs et al. |
| 6,505,093 B1 | 1/2003 | Thatcher et al. |
| 6,579,053 B1 | 6/2003 | Grams et al. |
| 6,685,031 B2 | 2/2004 | Takizawa |
| 6,688,459 B1 | 2/2004 | Bonham et al. |
| 6,705,528 B2 | 3/2004 | Good et al. |
| 6,762,382 B1 | 7/2004 | Danelski |
| 6,779,647 B1 | 8/2004 | Nagler |
| 7,728,244 B2 | 6/2010 | De Leo et al. |
| 8,662,314 B2 | 3/2014 | Jones et al. |
| 8,718,814 B1 | 5/2014 | Clark et al. |
| 8,776,694 B2 | 7/2014 | Rosenwinkel et al. |
| 8,798,784 B1 | 8/2014 | Clark et al. |
| 8,811,722 B2 | 8/2014 | Perez Cortes et al. |
| 8,972,049 B2 | 3/2015 | Tidhar et al. |
| 8,997,438 B1 | 4/2015 | Fallas |
| 9,102,336 B2 | 8/2015 | Rosenwinkel |
| 9,111,251 B1 | 8/2015 | Brazeau |
| 9,346,083 B2 | 5/2016 | Stone |
| 9,364,865 B2 | 6/2016 | Kim |
| 9,481,518 B2 | 11/2016 | Neiser |
| 9,486,926 B2 | 11/2016 | Kawano |
| 9,492,923 B2 | 11/2016 | Wellman et al. |
| 9,555,447 B2 | 1/2017 | Lykkegaard et al. |
| 9,751,693 B1 | 9/2017 | Battles et al. |
| 9,878,349 B2 | 1/2018 | Solystic |
| 9,926,138 B1 | 3/2018 | Brazeau et al. |
| 9,931,673 B2 | 4/2018 | Nice et al. |
| 9,937,532 B2 | 4/2018 | Wagner et al. |
| 9,962,743 B2 | 5/2018 | Bombaugh et al. |
| 9,975,148 B2 | 5/2018 | Zhu et al. |
| 10,058,896 B2 | 8/2018 | Solystic |
| 10,538,394 B2 * | 1/2020 | Wagner ................ B65G 47/902 |
| 2002/0026768 A1 | 3/2002 | Duncan et al. |
| 2002/0092801 A1 | 7/2002 | Dominguez |
| 2002/0147568 A1 | 10/2002 | Wenzel et al. |
| 2002/0157919 A1 | 10/2002 | Sherwin |
| 2002/0179502 A1 | 12/2002 | Cerutti et al. |
| 2003/0006122 A1 | 1/2003 | Street et al. |
| 2003/0034281 A1 | 2/2003 | Kumar |
| 2003/0038065 A1 | 2/2003 | Pippin et al. |
| 2003/0042112 A1 | 3/2003 | Woerner et al. |
| 2004/0065597 A1 | 4/2004 | Hanson |
| 2004/0144618 A1 | 7/2004 | McDonald et al. |
| 2004/0261366 A1 | 12/2004 | Gillet et al. |
| 2006/0045672 A1 | 3/2006 | Maynard et al. |
| 2007/0209976 A1 | 9/2007 | Worth et al. |
| 2008/0046116 A1 | 2/2008 | Khan et al. |
| 2008/0181753 A1 | 7/2008 | Bastian et al. |
| 2010/0122942 A1 | 5/2010 | Harres et al. |
| 2010/0318216 A1 | 12/2010 | Faivre et al. |
| 2011/0144798 A1 | 6/2011 | Freudelsperger |
| 2011/0154784 A1 | 6/2011 | Poutot |
| 2011/0238207 A1 | 9/2011 | Bastian, II et al. |
| 2011/0243707 A1 | 10/2011 | Dumas et al. |
| 2011/0320036 A1 | 12/2011 | Freudelsperger |
| 2012/0118699 A1 | 5/2012 | Buchmann et al. |
| 2013/0051696 A1 | 2/2013 | Garrett et al. |
| 2013/0110280 A1 | 5/2013 | Folk |
| 2013/0202195 A1 | 8/2013 | Perez Cortes et al. |
| 2014/0067127 A1 | 3/2014 | Gotou |
| 2014/0086714 A1 | 3/2014 | Malik |
| 2014/0166549 A1 | 6/2014 | Ito et al. |
| 2014/0244026 A1 | 8/2014 | Neiser |
| 2014/0277693 A1 | 9/2014 | Naylor |
| 2014/0291112 A1 | 10/2014 | Lyon et al. |
| 2014/0332344 A1 | 11/2014 | Jodoin |
| 2014/0360924 A1 | 12/2014 | Smith et al. |
| 2014/0364998 A1 | 12/2014 | Neiser et al. |
| 2015/0057793 A1 | 2/2015 | Kawano |
| 2015/0081090 A1 | 3/2015 | Dong |
| 2015/0114799 A1 | 4/2015 | Hansl et al. |
| 2015/0283586 A1 | 10/2015 | Dante et al. |
| 2015/0306634 A1 | 10/2015 | Maeda et al. |
| 2015/0346708 A1 | 12/2015 | Mattern et al. |
| 2015/0375880 A1 | 12/2015 | Ford et al. |
| 2016/0075521 A1 | 3/2016 | Puchwein et al. |
| 2016/0096694 A1 | 4/2016 | Baylor et al. |
| 2016/0157227 A1 | 6/2016 | Rune et al. |
| 2016/0176638 A1 | 6/2016 | Toebes |
| 2016/0199884 A1 | 7/2016 | Lykkegaard et al. |
| 2016/0221762 A1 | 8/2016 | Schroader |
| 2016/0228921 A1 | 8/2016 | Doublet |
| 2016/0244262 A1 | 8/2016 | O'Brien et al. |
| 2016/0347545 A1 | 12/2016 | Lindbo et al. |
| 2017/0021499 A1 | 1/2017 | Wellman et al. |
| 2017/0024896 A1 | 1/2017 | Houghton et al. |
| 2017/0043953 A1 | 2/2017 | Battles et al. |
| 2017/0066594 A1 | 3/2017 | Milo et al. |

(56) References Cited

U.S. PATENT DOCUMENTS

| | | |
|---|---|---|
| 2017/0066597 A1 | 3/2017 | Hiroi |
| 2017/0080566 A1 | 3/2017 | Stubbs et al. |
| 2017/0106532 A1 | 4/2017 | Wellman et al. |
| 2017/0121113 A1 | 5/2017 | Wagner et al. |
| 2017/0136632 A1 | 5/2017 | Wagner et al. |
| 2017/0157648 A1 | 6/2017 | Wagner et al. |
| 2017/0157649 A1 | 6/2017 | Wagner et al. |
| 2017/0173638 A1 | 6/2017 | Wagner et al. |
| 2017/0225330 A1 | 8/2017 | Wagner et al. |
| 2017/0312789 A1 | 11/2017 | Schroader |
| 2017/0349385 A1 | 12/2017 | Moroni et al. |
| 2017/0369244 A1 | 12/2017 | Battles et al. |
| 2018/0056333 A1 | 3/2018 | Hicham et al. |
| 2018/0127219 A1 | 5/2018 | Wagner et al. |
| 2018/0148272 A1 | 5/2018 | Wagner et al. |
| 2018/0330134 A1 | 11/2018 | Wagner et al. |

FOREIGN PATENT DOCUMENTS

| | | |
|---|---|---|
| CN | 102390701 A | 3/2012 |
| CN | 104507814 A | 4/2015 |
| CN | 104743367 A | 7/2015 |
| CN | 204714016 U | 10/2015 |
| CN | 105905019 A | 8/2016 |
| CN | 205500186 U | 8/2016 |
| CN | 108602630 A | 9/2018 |
| DE | 19510392 A1 | 9/1996 |
| DE | 102004001181 A1 | 8/2005 |
| DE | 102004013353 A1 | 10/2005 |
| DE | 102005061309 A1 | 7/2007 |
| DE | 102007023909 A1 | 11/2008 |
| DE | 102007028680 A1 | 12/2008 |
| DE | 102007038834 A1 | 2/2009 |
| DE | 102010002317 A1 | 8/2011 |
| DE | 102012003160 A1 | 9/2012 |
| DE | 102012102333 A1 | 9/2013 |
| DE | 102014111396 A1 | 2/2016 |
| EP | 0613841 A1 | 9/1994 |
| EP | 0648695 A2 | 4/1995 |
| EP | 1995192 A2 | 11/2008 |
| EP | 2511653 A1 | 10/2012 |
| EP | 2233400 B1 | 5/2013 |
| EP | 2650237 A1 | 10/2013 |
| EP | 2823899 A1 | 1/2015 |
| EP | 3006379 A2 | 4/2016 |
| EP | 3112295 A1 | 1/2017 |
| FR | 1457450 A | 1/1966 |
| FR | 2832654 A1 | 5/2003 |
| GB | 2084531 A | 4/1982 |
| GB | 2507707 A | 5/2014 |
| JP | S54131278 A | 10/1979 |
| JP | S63310406 A | 12/1988 |
| JP | 2002028577 A | 1/2002 |
| JP | 2002175543 A | 6/2002 |
| JP | 2007182286 A | 7/2007 |
| JP | 2008037567 A | 2/2008 |
| JP | 2014141313 A | 8/2014 |
| WO | 03074201 A1 | 9/2003 |
| WO | 2007009136 A1 | 1/2007 |
| WO | 2008091733 A2 | 7/2008 |
| WO | 2009021650 A1 | 2/2009 |
| WO | 2010017872 A1 | 2/2010 |
| WO | 2010034044 A1 | 4/2010 |
| WO | 2010099873 A1 | 9/2010 |
| WO | 2011038442 A2 | 4/2011 |
| WO | 2012024714 A2 | 3/2012 |
| WO | 2014064592 A2 | 5/2014 |
| WO | 2014166650 A1 | 10/2014 |
| WO | 2015035300 A1 | 3/2015 |
| WO | 2015118171 A1 | 8/2015 |
| WO | 2015162390 A1 | 10/2015 |
| WO | 2016100235 A1 | 6/2016 |
| WO | 2017044747 A1 | 3/2017 |
| WO | 2018017616 A1 | 1/2018 |

OTHER PUBLICATIONS

Communication pursuant to Rules 161(1) and 162 EPC for European Patent Application No. 18724053.6 issued by the European Patent Office dated Dec. 3, 2019, 3 pages.

Final Office Action issued by the U.S. Patent and Trademark Office dated Jan. 16, 2020, in related U.S. Appl. No. 15/961,294, 23 pages.

International Search Report and Written Opinion issued by the International Searching Authority in related International Application No. PCT/US2017/063382 dated Apr. 30, 2018, 16 pages.

International Preliminary Report on Patentability dated Jun. 6, 2019 in related PCT Application No. PCT/US2017/063382, 10 pages.

International Search Report and Written Opinion issued in International Patent Application No. PCT/US2018/029114 dated Aug. 6, 2018, 13 pages.

Communication pursuant to Rules 161(1) and 162 EPC for European Patent Application No. 17817490.0 issued by the European Patent Office dated Jul. 5, 2019, 3 pages.

Klingbeil et al., "Grasping with Application to an Autonomous Checkout Robot," Robotics and Automation (IRCA), 2011 IEEE International Conference on IEEE, Jun. 2011, 9 pages.

Non-Final Office Action issued by the U.S. Patent and Trademark Office dated Jul. 19, 2019, in related U.S. Appl. No. 15/824,009, 13 pages.

Non-Final Office Action issued by the U.S. Patent and Trademark Office dated Jun. 27, 2019, in related U.S. Appl. No. 15/961,294, 24 pages.

Rembold, et al., "Object turning for barcode search." In Proceedings. 2000 IEEE/RSJ International Conference on Intelligent Robots and Systems (IROS 2000)(Cat. No. 00CH37113), vol. 2, pp. 1267-1272. IEEE, 2000.

Cipolla, et al., "Visually guided grasping in unstructured environments." Robotics and Autonomous Systems 19, No. 3-4 (1997): 337-346.

Non-Final Office Action issued by the U.S. Patent and Trademark Office dated May 12, 2020, in related U.S. Appl. No. 16/703,589, 10 pages.

Examiner's Report issued by the Innovation, Science and Economic Development Canada in related Canadian Patent Application No. 3,045,115 dated Jul. 10, 2020, 4 pages.

First Office Action, and its English translation, issued by the National Intellectual Property Administration, P.R.C. in related Chinese Patent Application No. 201780073538.7 dated Jul. 23, 2020, 13 pages.

Notice of First Office Action and First Office Action (along with its English translation) issued by the China National Intellectual Property Administration in related Chinese Patent Application No. 201880038515.7 dated Oct. 21, 2020, 19 pages.

\* cited by examiner

SYSTEMS AND METHODS FOR PROVIDING SINGULATION OF OBJECTS FOR PROCESSING

PRIORITY

The present application is a continuation of U.S. patent application Ser. No. 15/824,009, filed Nov. 28, 2017, which claims priority to U.S. Provisional Patent Application Ser. No. 62/426,913, filed Nov. 28, 2016, the contents of which are hereby incorporated by reference in their entireties.

BACKGROUND

The invention generally relates to automated, robotic and other sortation and other processing systems, and relates in particular to automated and robotic systems intended for use in environments requiring, for example, that a variety of objects (e.g., articles, parcels or packages) be sorted and/or distributed to several output destinations.

Many object distribution systems receive objects in a disorganized stream that may be provided as individual objects or objects aggregated in groups such as in bags, arriving on any of several different conveyances, commonly a conveyor, a truck, a pallet, a Gaylord, or a bin. Each object must then be distributed to the correct destination container, as determined by identification information associated with the object, which is commonly determined by a label printed on the object or on a sticker on the object. The destination container may take many forms, such as a bag or a bin.

The sortation of such objects has traditionally been done, at least in part, by human workers that scan the objects, e.g., with a hand-held barcode scanner, and then place the objects at assigned locations. For example many order fulfillment operations achieve high efficiency by employing a process called wave picking. In wave picking, orders are picked from warehouse shelves and placed at locations (e.g., into bins) containing multiple orders that are sorted downstream. At the sorting stage individual objects are identified, and multi-object orders are consolidated, for example into a single bin or shelf location, so that they may be packed and then shipped to customers. The process of sorting these objects has traditionally been done by hand. A human sorter picks an object from an incoming bin, finds a barcode on the object, scans the barcode with a handheld barcode scanner, determines from the scanned barcode the appropriate bin or shelf location for the article, and then places the article in the so-determined bin or shelf location where all objects for that order have been defined to belong. Automated systems for order fulfillment have also been proposed. See for example, U.S. Patent Application Publication No. 2014/0244026, which discloses the use of a robotic arm together with an arcuate structure that is movable to within reach of the robotic arm.

Other ways of identifying objects by code scanning either require manual processing, or require that the code location be controlled or constrained so that a fixed or robot-held code scanner (e.g., barcode scanner) can reliably detect it. Manually operated barcode scanners are generally either fixed or handheld systems. With fixed systems, such as those used at point-of-sale systems, the operator holds the object and places it in front of the scanner so that the barcode faces the scanning device's sensors, and the scanner, which scans continuously, decodes any barcodes that it can detect. If the object is not immediately detected, the person holding the object typically needs to vary the position or rotation of the object in front of the fixed scanner, so as to make the barcode more visible to the scanner. For handheld systems, the person operating the scanner looks for the barcode on the object, and then holds the scanner so that the object's barcode is visible to the scanner, and then presses a button on the handheld scanner to initiate a scan of the barcode.

Further, many current distribution center sorting systems generally assume an inflexible sequence of operations whereby a disorganized stream of input objects is first singulated into a single stream of isolated objects presented one at a time to a scanner that identifies the object. An induction element or elements (e.g., a conveyor, a tilt tray, or manually movable bins) transport the objects to the desired destination or further processing station, which may be a bin, a chute, a bag or a conveyor etc.

In conventional parcel sortation systems, human workers or automated systems typically retrieve objects in an arrival order, and sort each object into a collection bin based on a set of given heuristics. For instance, all objects of like type might go to a collection bin, or all objects in a single customer order, or all objects destined for the same shipping destination, etc. The human workers or automated systems are required to receive objects and to move each to their assigned collection bin. If the number of different types of input (received) objects is large, a large number of collection bins is required.

Such a system has inherent inefficiencies as well as inflexibilities since the desired goal is to match incoming objects to assigned collection bins. Such systems may require a large number of collection bins (and therefore a large amount of physical space, large capital costs, and large operating costs) in part, because sorting all objects to all destinations at once is not always most efficient.

Current state-of-the-art sortation systems rely on human labor to some extent. Most solutions rely on a worker that is performing sortation, by scanning an object from an induction area (chute, table, etc.) and placing the object in a staging location, conveyor, or collection bin. When a bin is full or the controlling software system decides that it needs to be emptied, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Other partially automated sortation systems involve the use of recirculating conveyors and tilt trays, where the tilt trays receive objects by human sortation, and each tilt tray moves past a scanner. Each object is then scanned and moved to a pre-defined location assigned to the object. The tray then tilts to drop the object into the location. Other systems that include tilt trays may involve scanning an object (e.g., using a tunnel scanner), dropping the object into a tilt tray, associating the object with the specific tilt tray using a known location or position, for example, using beam breaks, and then causing the tilt tray to drop the object when it is at the desired location.

Further, partially automated systems, such as the bombbay style recirculating conveyor, involve having trays open doors on the bottom of each tray at the time that the tray is positioned over a predefined chute, and the object is then dropped from the tray into the chute. Again, the objects are scanned while in the tray, which assumes that any identifying code is visible to the scanner.

Such partially automated systems are lacking in key areas. As noted, these conveyors have discrete trays that can be loaded with an object; the trays then pass through scan tunnels that scan the object and associate it with the tray in which it is riding. When the tray passes the correct bin, a trigger mechanism causes the tray to dump the object into the bin. A drawback with such systems however, is that every divert requires an actuator, which increases the mechanical complexity and the cost per divert can be very high.

An alternative is to use human labor to increase the number of diverts, or collection bins, available in the system. This decreases system installation costs, but increases the operating costs. Multiple cells may then work in parallel, effectively multiplying throughput linearly while keeping the number of expensive automated diverts at a minimum. Such diverts do not ID an object and cannot divert it to a particular spot, but rather they work with beam breaks or other sensors to seek to ensure that indiscriminate bunches of objects get appropriately diverted. The lower cost of such diverts coupled with the low number of diverts keep the overall system divert cost low.

Unfortunately, these systems don't address the limitations to total number of system bins. The system is simply diverting an equal share of the total objects to each parallel manual cell. Thus each parallel sortation cell must have all the same collection bins designations; otherwise an object might be delivered to a cell that does not have a bin to which that object is mapped. There remains a need for a more efficient and more cost effective object sortation system that sorts objects of a variety of sizes and weights into appropriate collection bins or trays of fixed sizes, yet is efficient in handling objects of such varying sizes and weights.

SUMMARY

In accordance with an embodiment, the invention provides a processing system including a singulation system. The singulation system includes a conveying system for moving objects to be sorted from a source area along a first direction, a detection system for detecting objects at the conveying system, and for selecting certain selected objects for removal from the conveying system, and a removal system for removing the certain selected objects from the conveying system for providing a singulated stream of objects.

In accordance with another embodiment, the invention provides a singulation system that includes a conveying system for moving objects to be sorted from a source area along a first direction, a detection system for selecting certain selected objects for removal from the conveying system, and a removal system for removing the certain selected objects from the conveying system and for returning the certain selected objects to the source area such that a singulated stream of objects may be provided to an object processing system.

In accordance with a further embodiment, the invention provides a method of providing singulation of objects. The method includes the steps of moving objects to be sorted from a source area along a first direction at a conveying station, detecting objects at the conveying system, selecting certain selected objects for removal from the conveying system, and removing the certain selected objects from the conveying system.

BRIEF DESCRIPTION OF THE DRAWINGS

The following description may be further understood with reference to the accompanying drawings in which.

Figure 1:
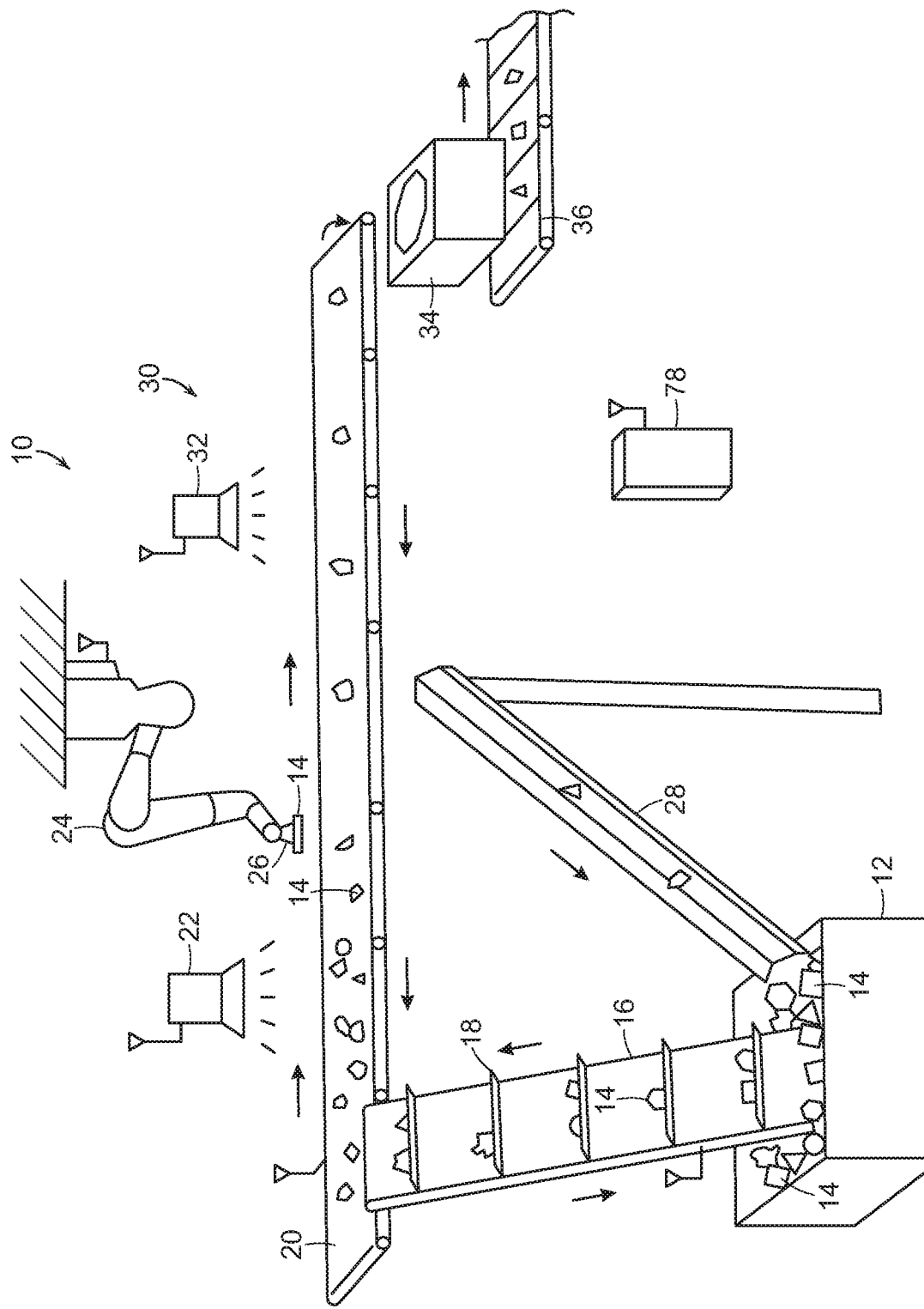
FIG. 1 shows an illustrative diagrammatic view of a system in accordance with an embodiment of the present invention.

The drawings are shown for illustrative purposes only.

DETAILED DESCRIPTION

In accordance with an embodiment, the invention provides a processing (e.g., sortation) system that includes an input system for receiving a wide variety of objects to be sorted, and a singulation system for providing a singulated stream of objects for efficient processing of the objects. In further embodiments, the system may include an identification system for identifying objects, and an output system for providing the singulated stream of objects at desired output destinations. Individual parcels need to be identified and conveyed to desired parcel-specific locations. The described systems reliably automate the identification and conveyance of such parcels, employing in certain embodiments, a set of conveyors and sensors and a robot arm. In short, applicants have discovered that when automating the sortation of objects, there are a few main things to consider: 1) the overall system throughput (parcels sorted per hour), 2) the number of diverts (i.e., number of discrete locations to which an object can be routed), 3) the total area of the sortation system (square feet), 4) sort accuracy, and 5) the annual costs to run the system (man-hours, electrical costs, cost of disposable components).

Sorting objects in a distribution center is one application for automatically identifying and sorting parcels. In a shipping distribution center, parcels commonly arrive in trucks, totes, Gaylords or other vessels for delivery, are conveyed to sortation stations where they are sorted according to desired destinations, aggregated in bags, and then loaded in trucks for transport to the desired destinations. Another application would be in the shipping department of a retail store or order fulfillment center, which may require that parcels be sorted for transport to different shippers, or to different distribution centers of a particular shipper. In a shipping or distribution center the parcels may take the form of plastic bags, boxes, tubes, envelopes, or any other suitable container, and in some cases may also include objects not in a container. In a shipping or distribution center the desired destination is commonly obtained by reading identifying information printed on the parcel or on an attached label. In this scenario the destination corresponding to identifying information is commonly obtained by querying the customer's information system. In other scenarios the destination may be written directly on the parcel, or may be known through other means.

In accordance with various embodiments, therefore, the invention provides a method of taking individual parcels from a disorganized stream of parcels, providing a singulated stream of objects, identifying individual parcels, and sorting them to desired destinations. The invention further provides methods for loading parcels into the system, for conveying parcels from one point to the next, for excluding inappropriate or unidentifiable parcels, for grasping parcels, for determining grasp locations, for determining robot motion trajectories, for transferring parcels from one conveyor to another, for aggregating parcels and transferring to output conveyors, for digital communication within the system and with outside information systems, for communication with human operators and maintenance staff, and for maintaining a safe environment.

Figure 2:
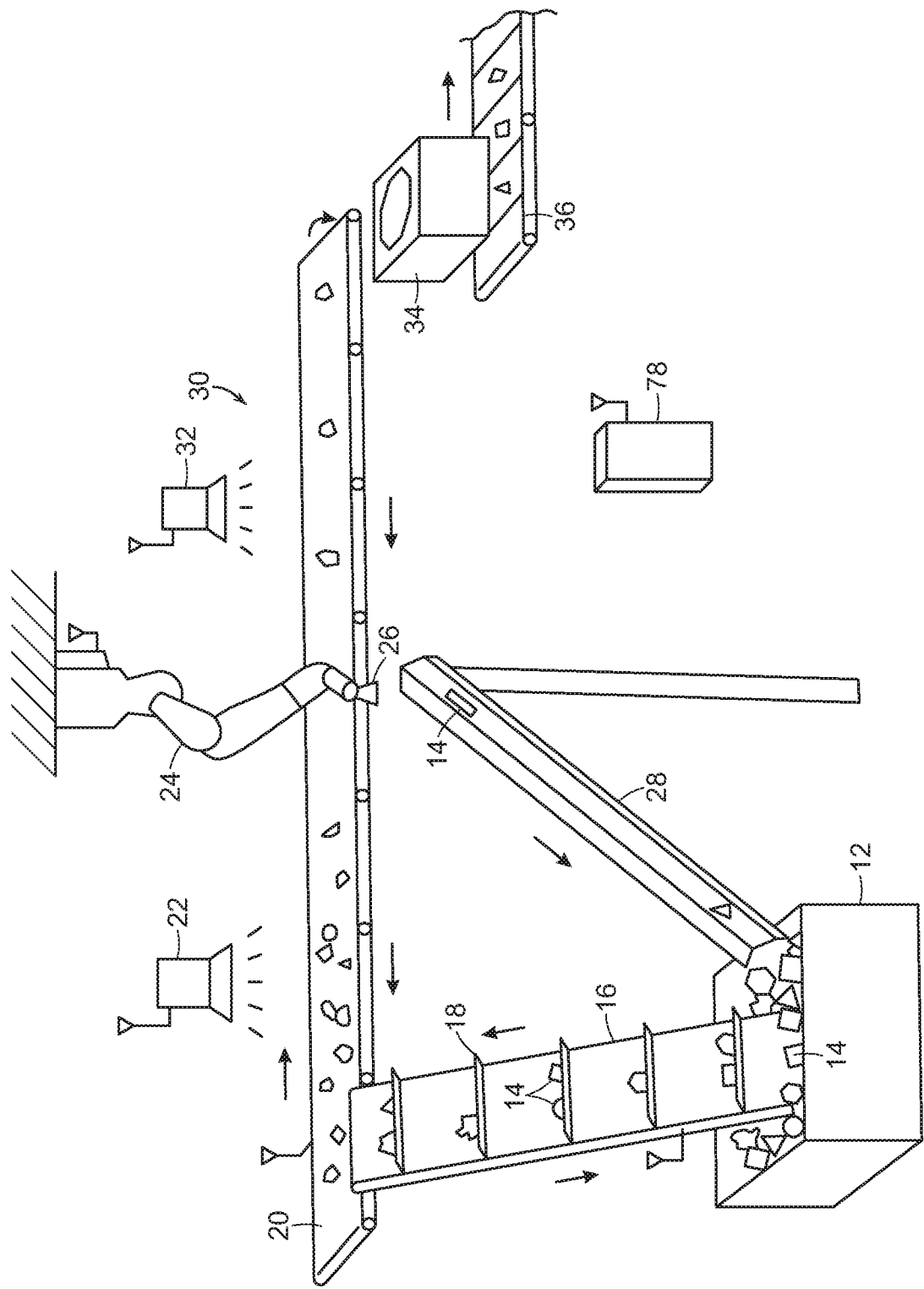
FIG. 2 shows an illustrative diagrammatic view of the system of FIG. 1 wherein an object is being returned to an input bin for purposes of providing a singulated stream of objects.

Important components of an automated parcel identification and sortation system, in accordance with an embodiment of the present invention, are shown in FIG. 1. FIG. 1 shows a system 10 that includes an infeed hopper 12 into which objects 14 may be dumped, e.g., by a dumper or Gaylord. An infeed conveyor 16 conveys objects from the infeed hopper 12 to primary conveyor 20. The infeed conveyor 16 may include baffles 18 or cleats for assisting in lifting the objects 14 from the hopper 12 onto a primary conveyor 20. Primary perception system 22 surveys the objects 14 to identify objects when possible and to determine good grasp points. Robot arm 24 with gripper 26 grips objects 14, and as shown in FIG. 2, moves selected objects 14 to a return chute 28 for return to the input hopper 12.

As shown in FIG. 1, a system 10 may provide that a portion of the input stream is selectively adjusted by the robotic arm 24 to provide a singulated stream 30 of objects (as may be detected and confirmed by a perception unit 32). In particular objects are identified by the primary perception unit 22 as being selected for removal, and the robotic arm 24 is engaged to selectively remove objects from the input stream to create a singulated stream of objects. As shown in FIG. 2, the removed objects 14 are placed by the gripper 26 of the robotic arm onto a return chute 28 that returns the selected objects to the input bin 12. Significantly, a singulated stream of objects is provided (as shown at 30), and this singulated stream of objects may be delivered to a drop perception unit 34 (as discussed below) as a singulated stream and without requiring that a robotic system place objects into the drop perception unit. By providing a singulated stream of objects for processing, the system is able to more effectively control the object processing rate, reducing the incidence of errors that may occur, for example of two objects in close contact with each other are perceived as being one object. The infeed conveyor 16 may also be in communication with the controller 78 and the robotic arm 24, and speed of the infeed conveyor 16 may be adjusted to either slow down if moving too fast, or speed up if system determines that more bandwidth exists for a faster input. The speed and direction of the conveyor 20 may also be adjusted as may be necessary.

Figure 3:
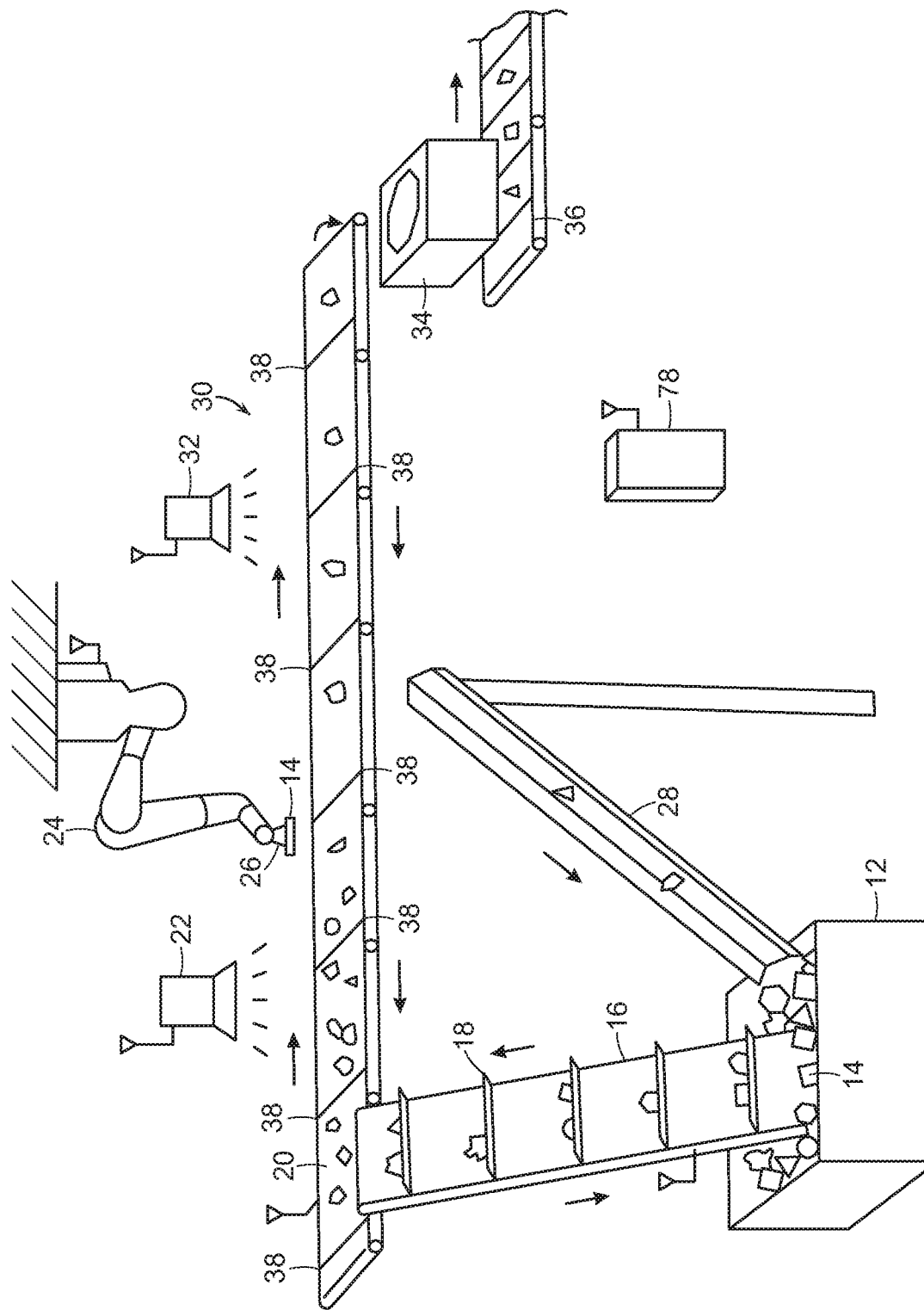
FIG. 3 shows an illustrative diagrammatic view of a system in accordance with another embodiment of the present invention.
Figure 4:
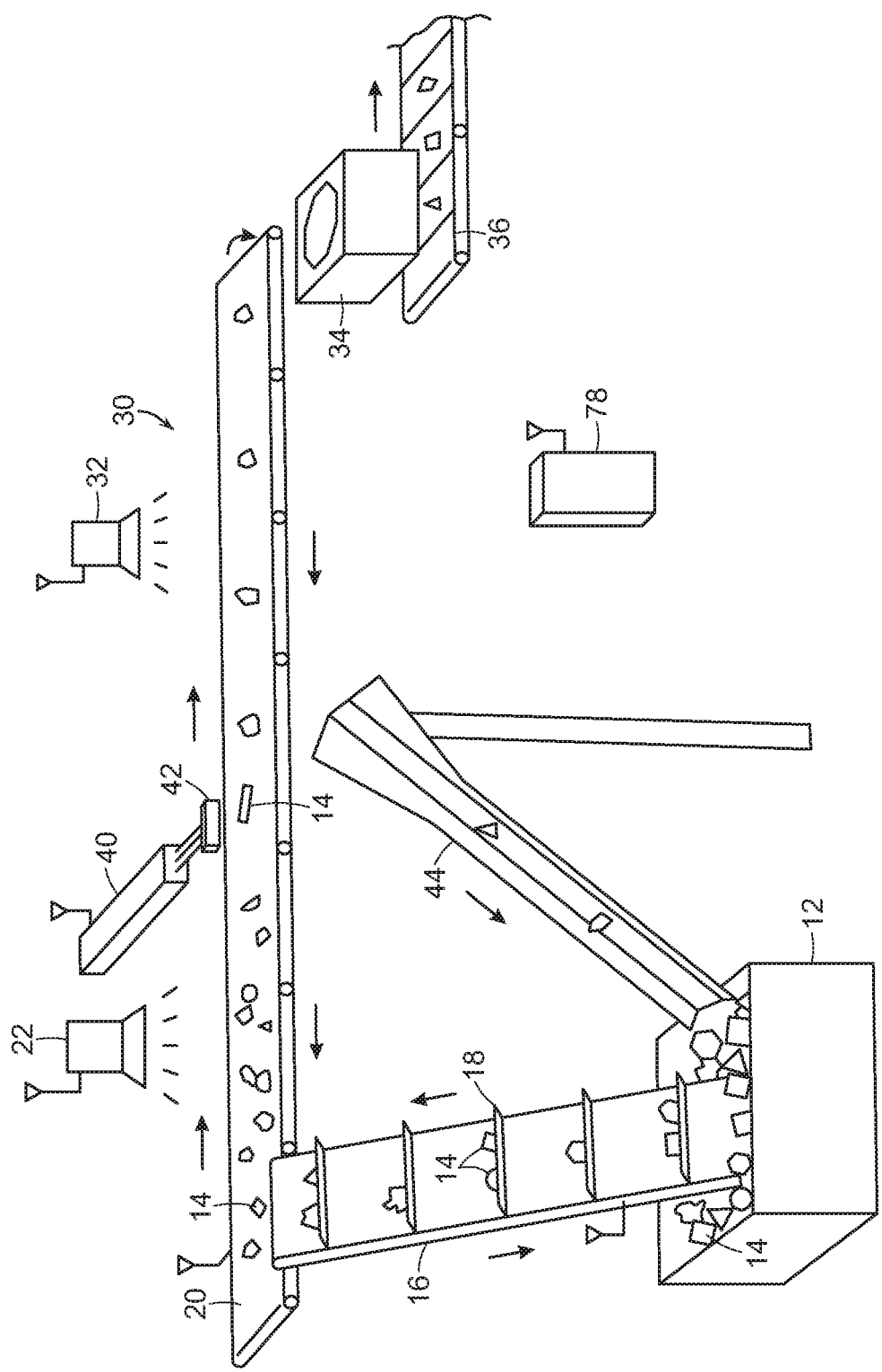
FIG. 4 shows an illustrative diagrammatic view of a system in accordance with a further embodiment of the present invention that includes a push device.
Figure 5:
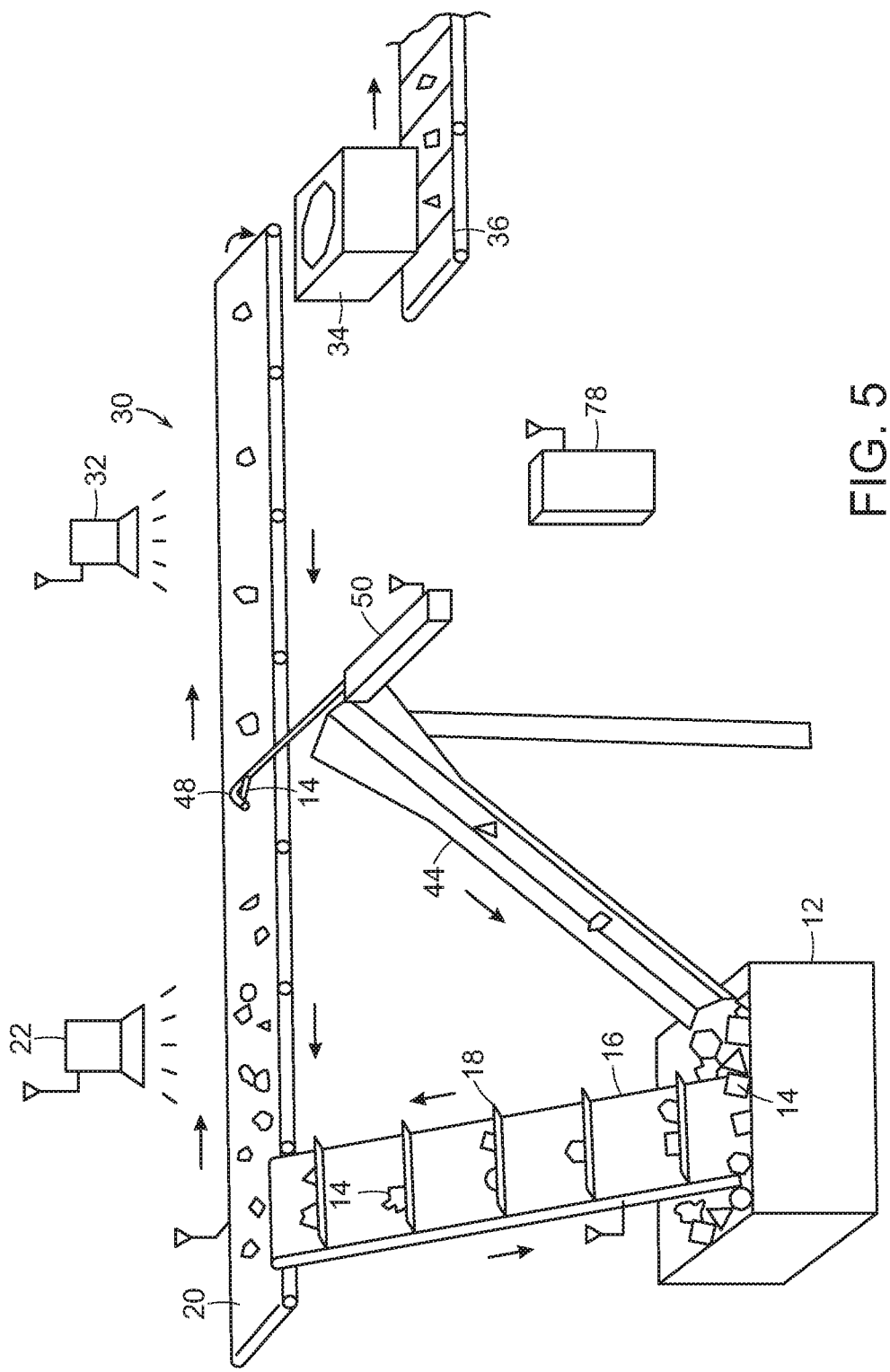
FIG. 5 shows an illustrative diagrammatic view of a system in accordance with a further embodiment of the present invention that includes a pull device.

As further shown in FIG. 3, the conveyor 20 may further be provided with cleats 38 such that when the singulated stream of objects 30 is provided, it is provided such that one object is positioned within one cleated area. The remaining elements of the system of FIG. 3 are the same as those of FIGS. 1 and 2 and bear the same reference numerals. As shown in FIG. 4, in accordance with further embodiments, the singulation system may employ a diverter 40 that includes a push bar 42 that may be employed to push an object that is intended for removal into a return chute 44 for return to the input hopper 12. Again, a singulated stream of objects 30 is provided. As shown in FIG. 5, in accordance with further embodiments, the singulation system may employ a diverter 50 that includes a pull bar 48 that may be employed to pull an object that is intended for removal into a return chute 44 for return to the input hopper 12. Again, a singulated stream of objects 30 is provided.

Figure 6:
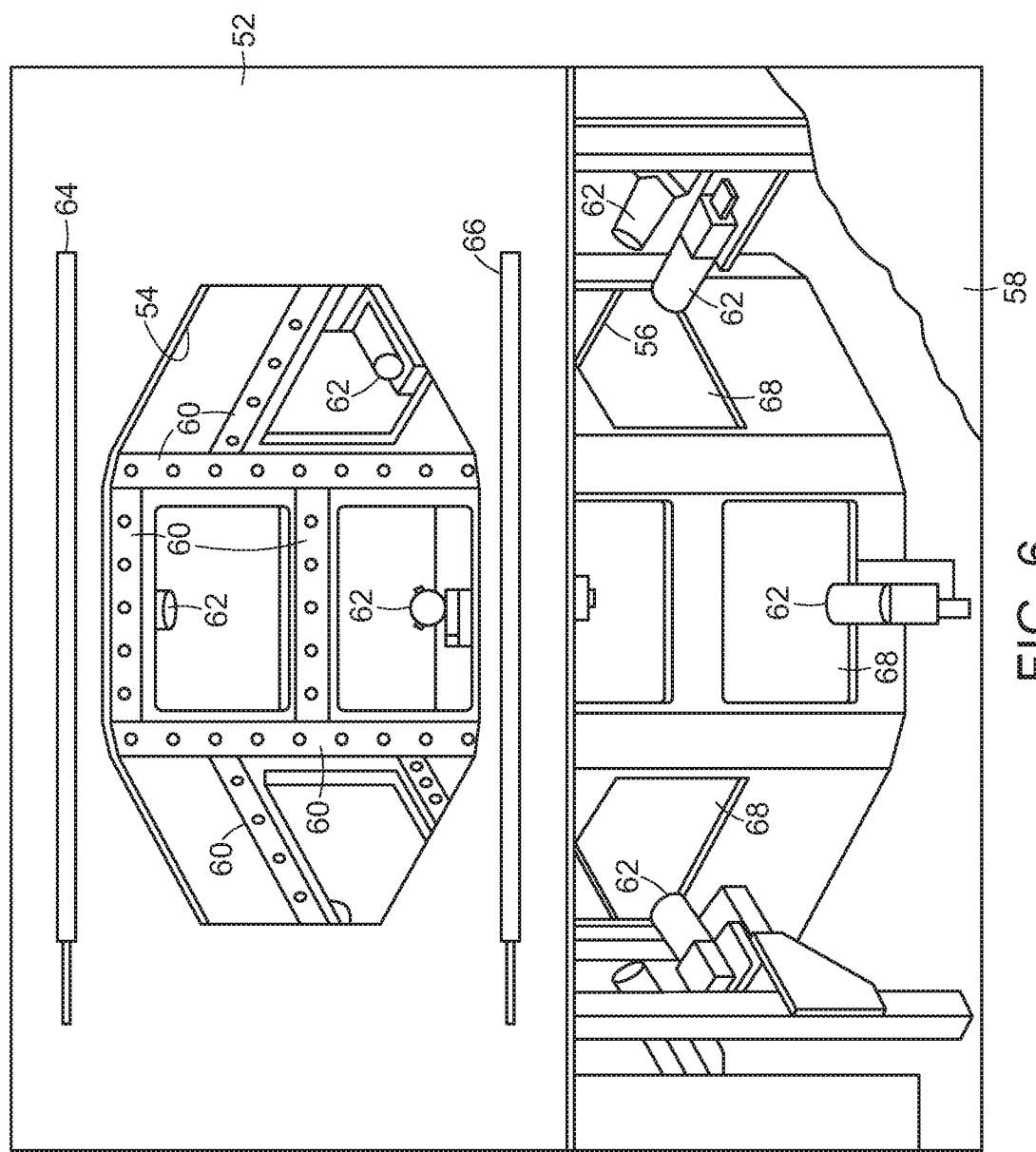
FIG. 6 shows an illustrative diagrammatic front view of a drop scanner in accordance with an embodiment of the present invention.
Figure 7:
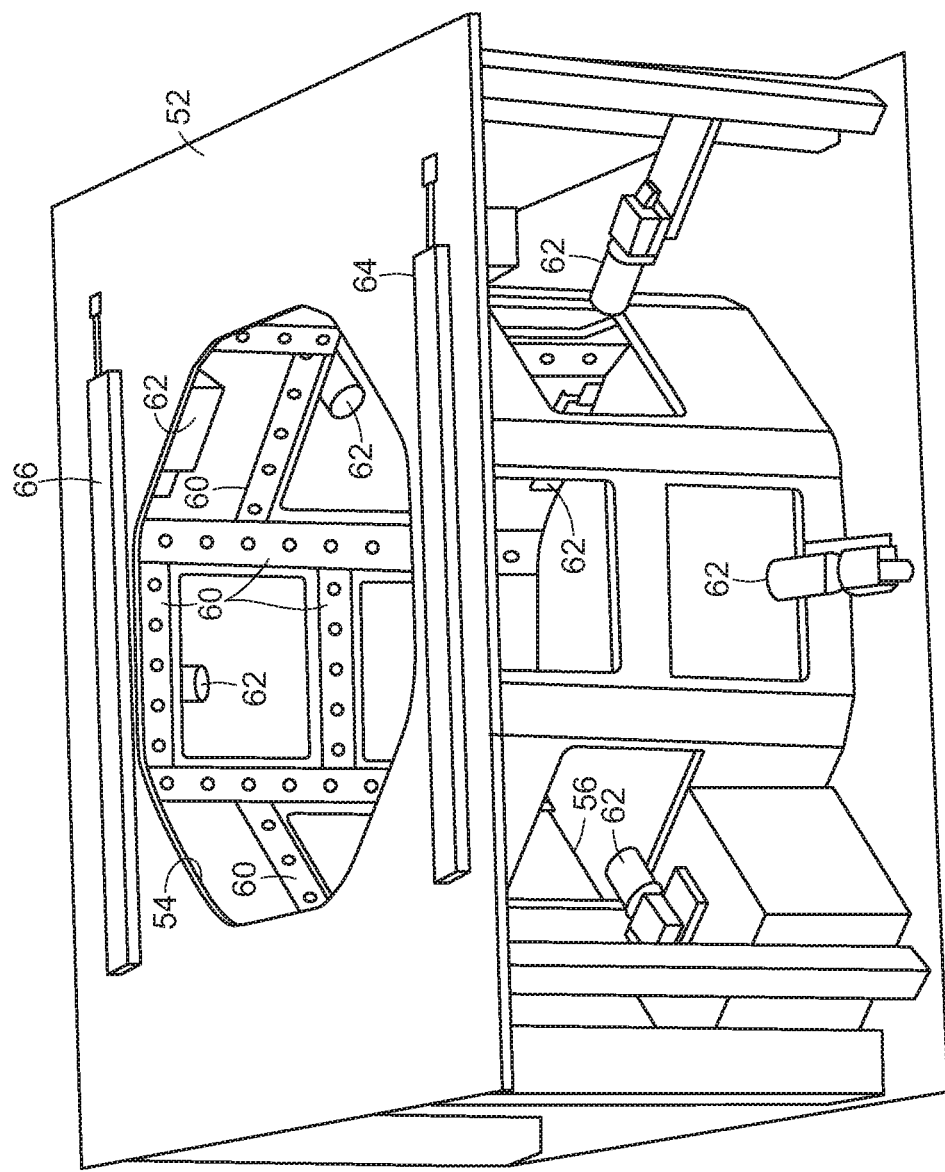
FIG. 7 shows an illustrative diagrammatic rear view of the drop scanner shown in FIG. 5.

The secondary perception system 34 may be supported by stands or may be suspended from above. As further shown in FIGS. 6 and 7, the secondary perception system 34 may include a structure 52 having a top opening 54 and a bottom opening 56, and may be covered by an enclosing material 58 (a portion of which is shown in FIG. 6), e.g., a colored covering such as orange plastic, to protect humans from potentially dangerously bright lights within the secondary perception system. The structure 52 includes a plurality of rows of sources (e.g., illumination sources such as LEDs) 60 as well as a plurality of perception units (e.g., cameras) 62. The sources 60 are provided in rows, and each is directed toward the center of the opening. The perception units 62 are also generally directed toward the opening, although some cameras are directed horizontally, while others are directed upward, and some are directed downward. The system 34 also includes an entry source (e.g., infrared source) 64 as well as an entry detector (e.g., infrared detector) 66 for detecting when an object has entered the perception system 34. The LEDs and cameras therefore encircle the inside of the structure 52, and the cameras are positioned to view the interior via windows that may include a glass or plastic covering (e.g., 68). The entire structure 52 may be covered by an enclosing material such as a colored covering such as orange plastic, to protect humans from potentially dangerously bright lights within the secondary perception system.

Figure 12:
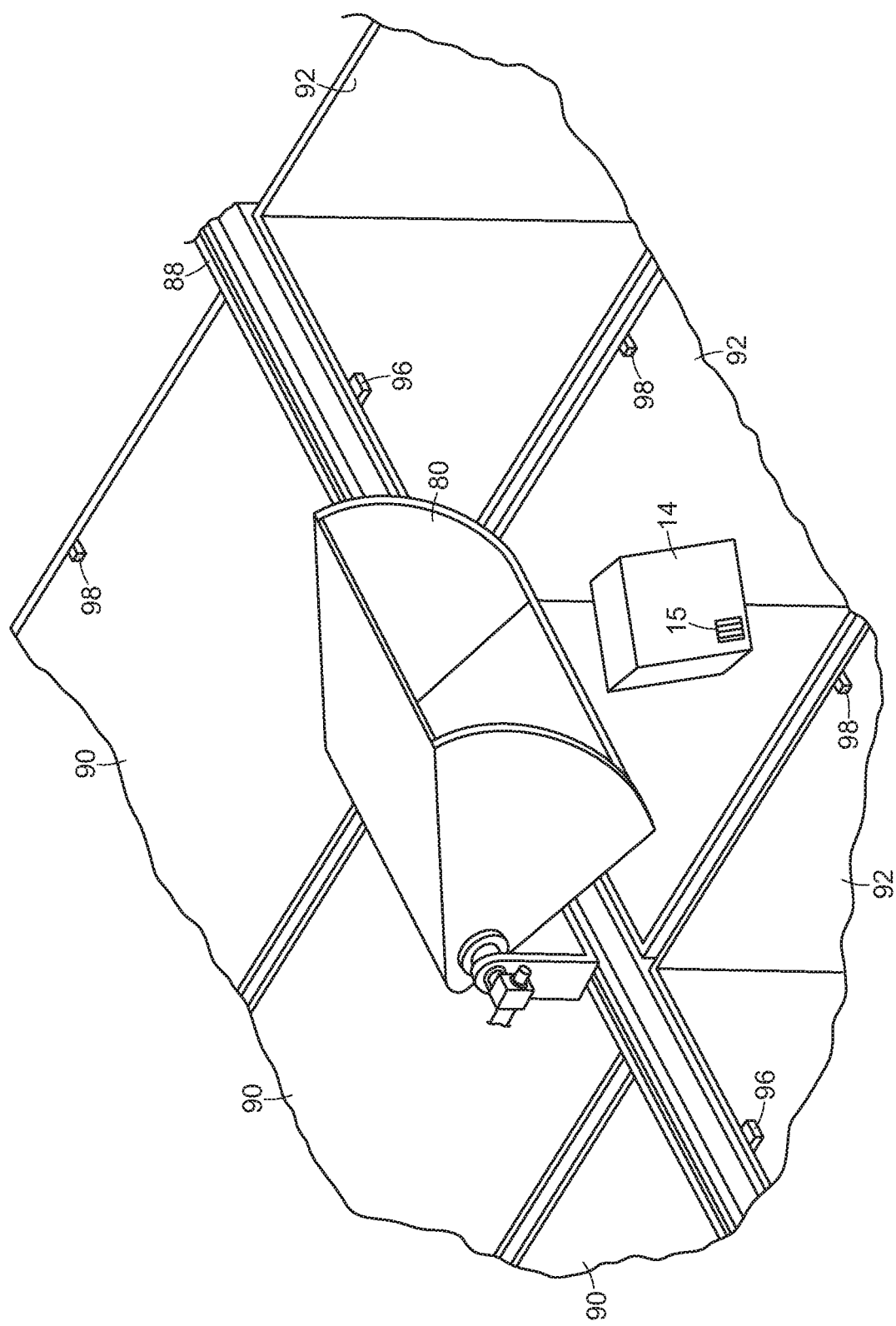
FIG. 12 shows an illustrative diagrammatic view of the carriage of FIG. 11 dropping its contents into a bin in the shuttle section of FIG. 10.

An important aspect of systems of certain embodiments of the present invention, is the ability to identify via barcode or other visual markings (e.g., as shown at 15 in FIG. 12) objects by employing a perception system into which objects may be dropped. Automated scanning systems would be unable to see barcodes on objects that are presented in a way that their barcodes are not exposed or visible. The perception system may be used in certain embodiments, with a robotic system that may include a robotic arm equipped with sensors and computing, that when combined is assumed herein to exhibit the following capabilities: (a) it is able to pick objects up from a specified class of objects, and separate them from a stream of heterogeneous objects, whether they are jumbled in a bin, or are singulated on a motorized or gravity conveyor system; (b) it is able to move the object to arbitrary places within its workspace; (c) it is able to place objects in an outgoing bin or shelf location in its workspace; and, (d) it is able to generate a map of objects that it is able to pick, represented as a candidate set of grasp points in the workcell, and as a list of polytopes enclosing the object in space.

The allowable objects are determined by the capabilities of the robotic system. Their size, weight and geometry are assumed to be such that the robotic system is able to pick, move and place them. These may be any kind of ordered goods, packages, parcels, or other articles that benefit from automated sorting. Each object is associated with unique identifying indicia (identity or destination, such as a bar code or a unique address), which identifies the object or its destination location.

The manner in which inbound objects arrive may be for example, in one of two configurations: (a) inbound objects arrive piled in bins of heterogeneous objects; or (b) inbound articles arrive by a moving conveyor. The collection of objects includes some that have exposed bar codes and other objects that do not have exposed bar codes. The robotic system is assumed to be able to pick items from the bin or conveyor. The stream of inbound objects is the sequence of objects as they are unloaded either from the bin or the conveyor.

The manner in which outbound objects are organized is such that objects are placed in a bin, shelf location or cubby, into which all objects corresponding to a given order are consolidated. These outbound destinations may be arranged in vertical arrays, horizontal arrays, grids, or some other regular or irregular manner, but which arrangement is known to the system. The robotic pick and place system is assumed to be able to place objects into all of the outbound destinations, and the correct outbound destination is determined from the unique identifying indicia (identity or destination) of the object.

It is assumed that the objects are marked in one or more places on their exterior with a visually distinctive mark such as a barcode or radio-frequency identification (RFID) tag so that they may be identified with a scanner. The type of marking depends on the type of scanning system used, but may include 1D or 2D barcode symbologies. Multiple symbologies or labeling approaches may be employed. The types of scanners employed are assumed to be compatible with the marking approach. The marking, either by barcode, RFID tag, or other means, encodes a symbol string, which is typically a string of letters and numbers. The symbol string uniquely associates the object with unique identifying indicia (identity or destination).

The operations of the systems described herein are coordinated by the central control system 78 as shown in FIGS. 1-5, 8, 9, 14 and 17. This system determines from symbol strings the UPC associated with an object, as well as the outbound destination for the object. The central control system is comprised of one or more workstations or central processing units (CPUs). The correspondence between UPCs and outbound destinations is maintained by the central control system in a database called a manifest. The central control system maintains the manifest by communicating with a warehouse management system (WMS).

During operation, the broad flow of work may be generally as follows. First, the system is equipped with a manifest that provides the outbound destination for each inbound object. Next, the system waits for inbound objects to arrive either in a bin or on a conveyor. The robotic system may drop one item at a time from the primary conveyor, and may drop each item into the perception system discussed above. If the perception system successfully recognizes a marking on the object, then the object is then identified and forwarded to a sorting station or other processing station. If the object is not identified, the robotic system may either replace the object back onto the input conveyor and try again, or the conveyor may divert the object to a human sortation bin to be reviewed by a human.

The sequence of locations and orientations of the perception units 62 are chosen so as to minimize the average or maximum amount of time that scanning takes. Again, if the object cannot be identified, the object may be transferred to a special outbound destination for unidentified objects, or it may be returned to the inbound stream. This entire procedure operates in a loop until all of the objects in the inbound set are depleted. The objects in the inbound stream are automatically identified, sorted, and routed to outbound destinations.

In accordance with an embodiment therefore, the invention provides a system for sorting objects that arrive in inbound bins and that need to be placed into a shelf of outbound bins, where sorting is to be based on a unique identifier symbol. Key specializations in this embodiment are the specific design of the perception system so as to maximize the probability of a successful scan, while simultaneously minimizing the average scan time. The probability of a successful scan and the average scan time make up key performance characteristics. These key performance characteristics are determined by the configuration and properties of the perception system, as well as the object set and how they are marked.

The two key performance characteristics may be optimized for a given item set and method of barcode labeling. Parameters of the optimization for a barcode system include the number of barcode scanners, where and in what orientation to place them, and what sensor resolutions and fields of view for the scanners to use. Optimization can be done through trial and error, or by simulation with models of the object.

Optimization through simulation employs a barcode scanner performance model. A barcode scanner performance model includes the range of positions, orientations and barcode element size from which a barcode symbol can be detected and decoded by the barcode scanner, where the barcode element size is the size of the smallest feature on the barcode. These are typically rated at a minimum and maximum range, a maximum skew angle, a maximum pitch angle, and a minimum and maximum tilt angle.

Typical performance for camera-based barcode scanners are that they are able to detect barcode symbols within some range of distances as long as both pitch and skew of the plane of the symbol are within the range of plus or minus 45 degrees, while the tilt of the symbol can be arbitrary (between 0 and 360 degrees). The barcode scanner performance model predicts whether a given barcode symbol in a given position and orientation will be detected.

The barcode scanner performance model is coupled with a model of where barcodes would expect to be positioned and oriented. A barcode symbol pose model is the range of all positions and orientations, in other words poses, in which a barcode symbol will expect to be found. For the scanner, the barcode symbol pose model is itself a combination of an article gripping model, which predicts how objects will be held by the robotic system, as well as a barcode-item appearance model, which describes the possible placements of the barcode symbol on the object. For the scanner, the barcode symbol pose model is itself a combination of the barcode-item appearance model, as well as an inbound-object pose model, which models the distribution of poses over which inbound articles are presented to the scanner. These models may be constructed empirically, modeled using an analytical model, or approximate models may be employed using simple sphere models for objects and a uniform distributions over the sphere as a barcode-item appearance model.

Figure 8:
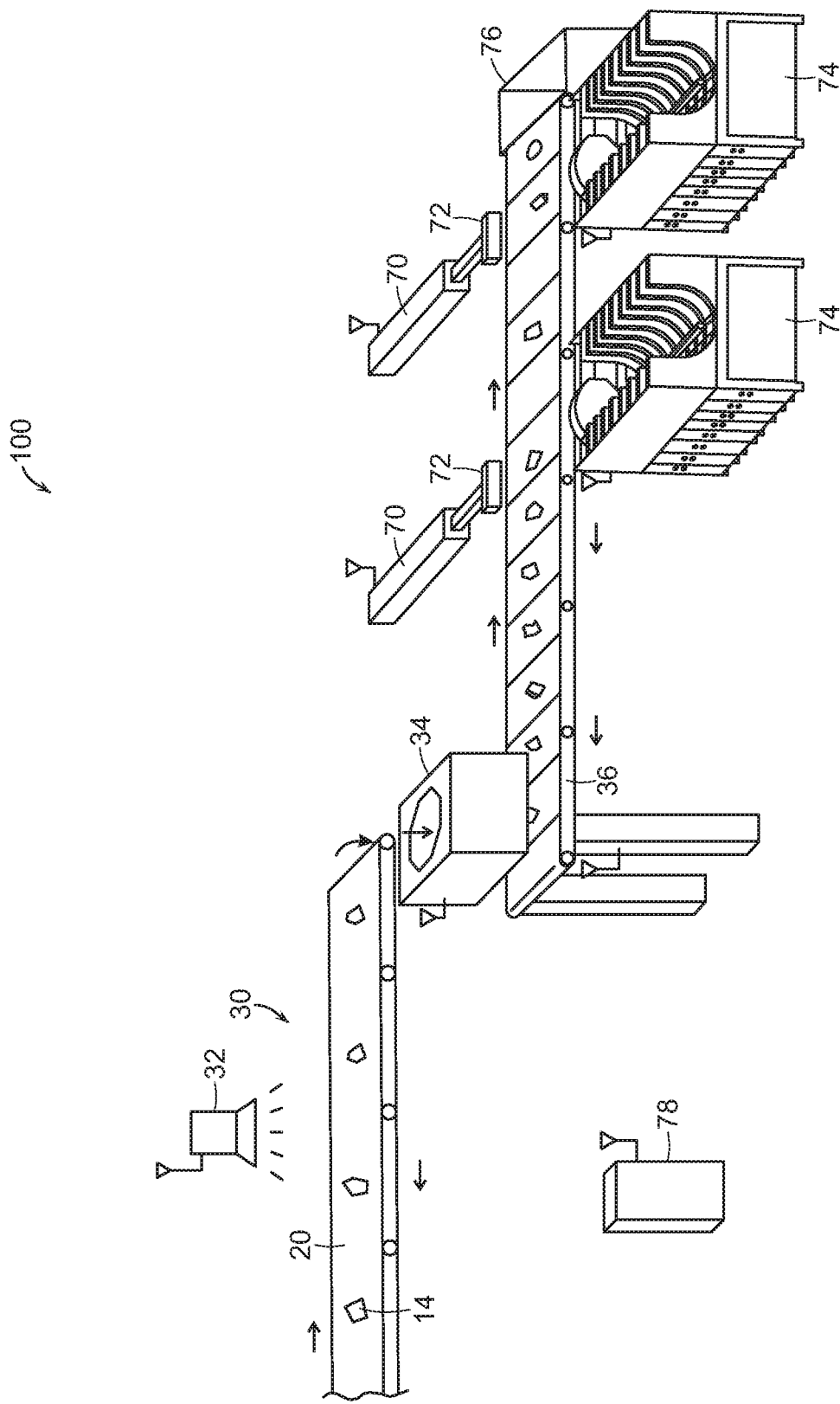
FIG. 8 shows an illustrative diagrammatic view of an object processing system in accordance with an embodiment of the present invention.

With reference to FIG. 8, in a processing system 100 of an embodiment of the invention, objects 14 passing through the secondary perception unit 34 fall onto secondary conveyor 36. Diverters 70 including push bars 72 divert objects to shuttle sections 74 as appropriate. While only two such diverters and shuttle sections are shown, any number of such diverters and shuttle sections may be used. Unidentified objects or otherwise unacceptable objects continue along secondary conveyor 36 and fall into secondary exception bin 76. The diverters 70 are in communication with the controller 78, which is in communication with the scanner 32 as well as the indexing position of the conveyor 20. Once an object falls through the scanner and lands on the conveyor 36, the system notes the conveyor position of the object. The scanner information is processed, and the object (if identified) is associated with that conveyor location, and its processing location is identified (as discussed in more detail below). As the conveyor advances, the system will know when the object is in the line of activation of a selected diverter, and will activate the diverter to push the object into the appropriate carriage. The carriage then moves the object to the assigned bin as discussed in more detail below. In various embodiments, the diverters may push an object off through various other ways, such as using a robot or a diverting guide, and in further embodiments, the diverters may pull an object off of the conveyor.

Figure 9:
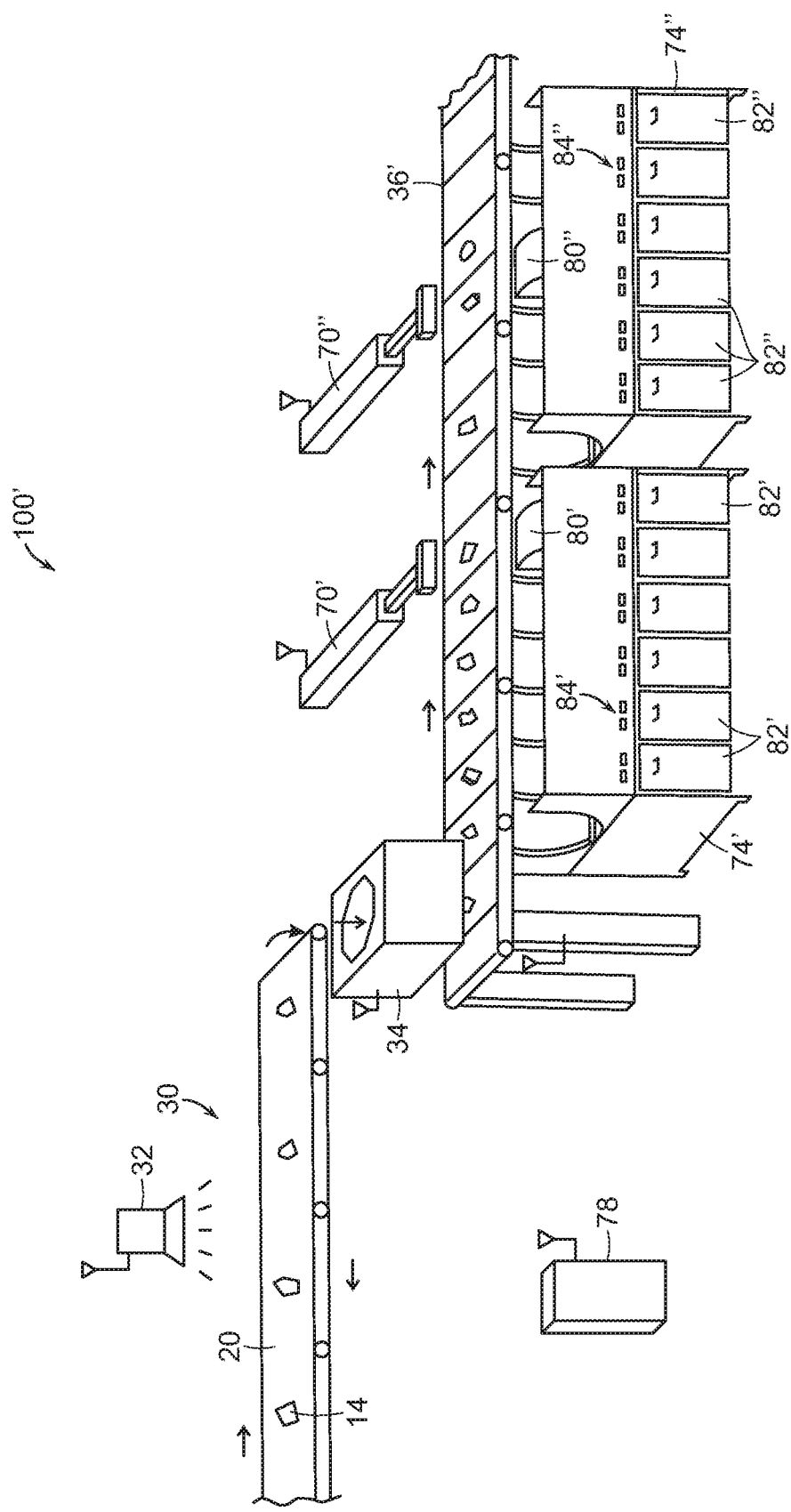
FIG. 9 shows an illustrative diagrammatic view of an object processing system in accordance with another embodiment of the present invention.

FIG. 9 shows a processing system 100' similar to that shown in FIG. 8 (where the identical components have the same reference numbers), except that the shuttle sections 74' of FIG. 8 are positioned alongside (parallel with) the conveyor 36'. In particular, a first diverter 70' may push an object into a carriage 80' at one end of a shuttle section 74', while a second diverter 70" may push an object into a carriage 80" in the middle of a shuttle section 74". In accordance with further embodiments, many different arrangements are possible, and each is within the spirit and scope of the present invention. Each drawer 82' and 82" may as discussed below, and the indicator lights 84', 84" may be located above the drawers 82', 82".

Similarly, the diverters 70', 70" are in communication with the controller 78, which is in communication with the scanner 34 as well as the indexing position of the conveyor 36'. Again, in various embodiments, the diverters may push an object off through various other ways, such as using a robot or a diverting guide, and in further embodiments, the diverters may pull an object off of the conveyor. Once an object falls through the scanner and lands of the conveyor, the system notes the conveyor position of the object. The scanner information is processed, and the object (if identified) is associated with that conveyor location, and its processing location is identified (as discussed in more detail below). Again, as the conveyor advances, the system will know when the object is in the line of activation of a selected diverter, and will activate the diverter to push the object into the appropriate carriage. The carriage then moves the object to the assigned bin as discussed in more detail below.

Figure 10:
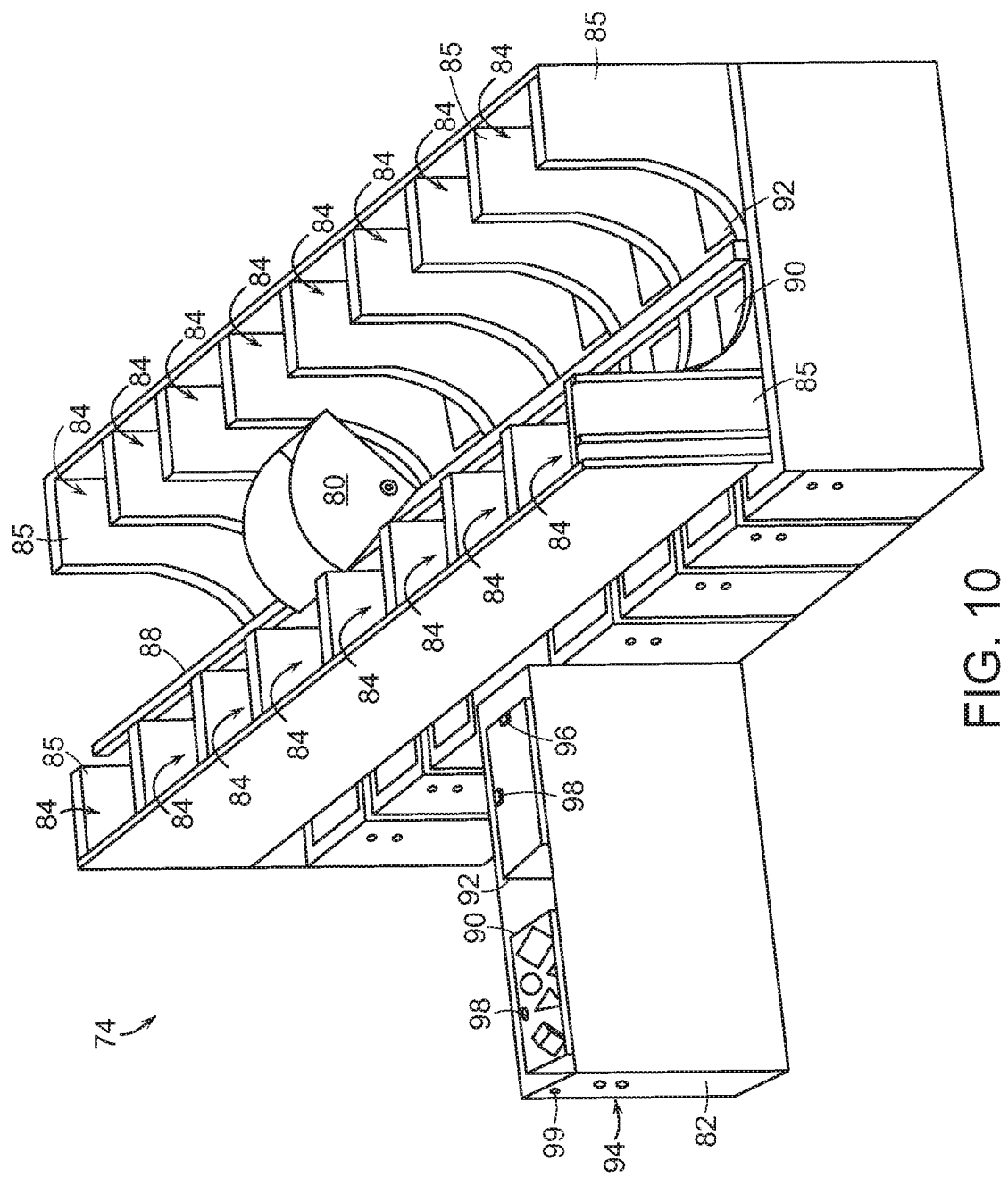
FIG. 10 shows an illustrative diagrammatic view of a shuttle section in the system shown in FIGS. 8 and 9.
Figure 11:
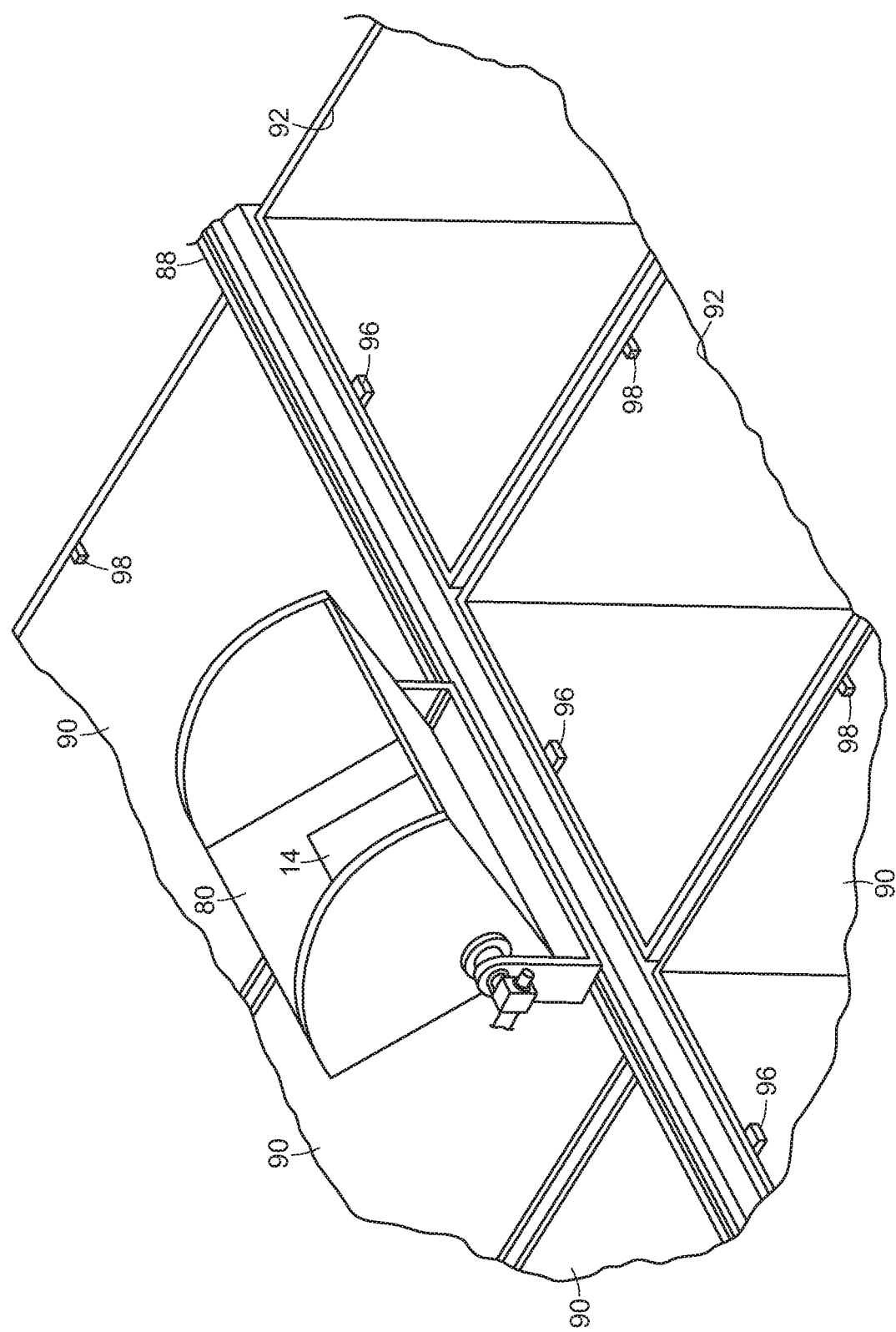
FIG. 11 shows an illustrative diagrammatic view of the carriage on the track adjacent bins in the shuttle section shown in FIG. 10.
Figure 13:
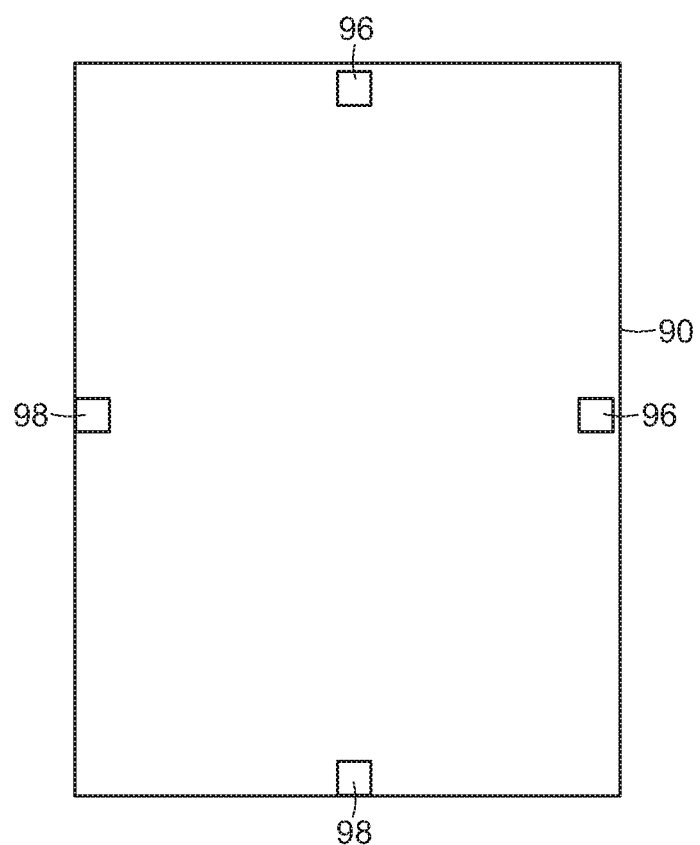
FIG. 13 shows an illustrative top view of a bin in the shuttle section shown in FIG. 10.

As further shown with reference to FIG. 10, each shuttle section 74 incudes a carriage 80 that shuttles back and forth between destination chutes 84 that include guide walls 85 that lead to two rows of bins 90, 92 on either side of track 88. As further shown in FIGS. 11 and 12 (with the guide walls 85 removed for clarity) the carriage 80 travels along the track 88 and carries objects to a desired destination bin 90, 92, and tilts, dropping the object 14 (having indicia 15 such as a bar code that was detected by the scanner 34) into the desired destination bin. The guide walls serve to guide the object as it falls so that the object does not accidently drop into a neighboring bin. As further shown in FIG. 13, each bin (90, 92), may include one or more pairs of emitters 96 and sensors 98 at the top of the bin. Output from a sensor 98 that is representative of a prolonged interruption from the associated source, may be used to determine that the bin is full.

Again, a central computing and control station 78 communicates with other computers distributed in the other components, and also communicates with the customer information system, provides a user interface, and coordinates all processes. As further shown in FIG. 10, each processing bin 90, 92 of each shuttle section 74 may include a pull out drawer 82 from which each of the two opposing processing bins (e.g., 90, 92) may be accessed and emptied. Each pull-out drawer 82 may also include light indicators 94 to indicate when the processing bin (e.g., 90, 92) is either full or is ready to be emptied based on system heuristics, e.g., that the bin is statistically unlikely to receive another object soon. In other embodiments, such lights may be positioned above the respective bin. Each drawer may also include a lock 99 that a person must unlock to pull out the drawer 82. The lock includes sensors that communicate with the controller 78, and when a drawer is unlocked, the system knows not to sort to either bin in the unlocked drawer. This way, the system may continue operating while drawers are pulled and bins are emptied.

Figure 14:
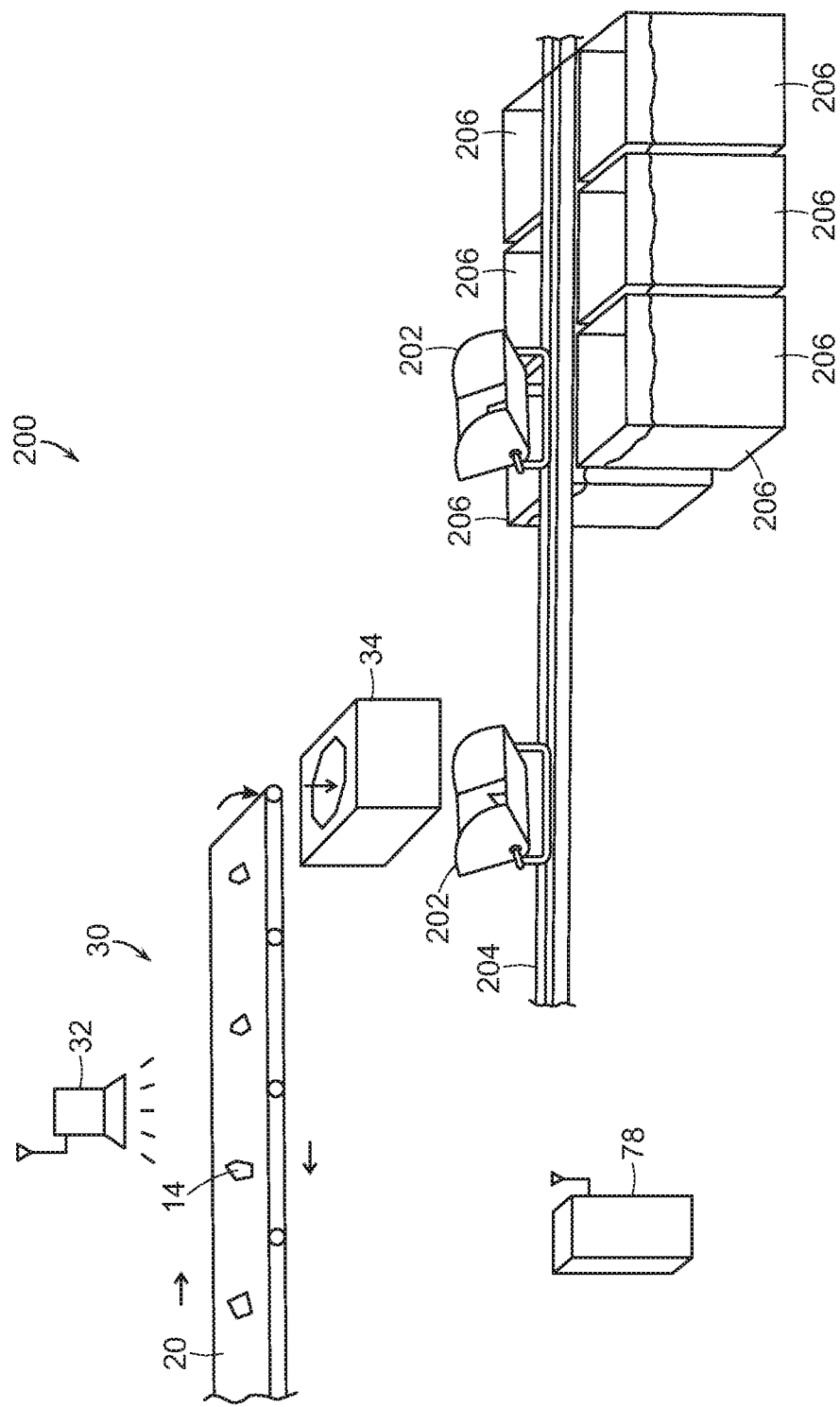
FIG. 14 shows an illustrative diagrammatic view of a system in accordance with a further embodiment of the present invention that includes carriages that receive objects from a drop scanner.
Figure 15:
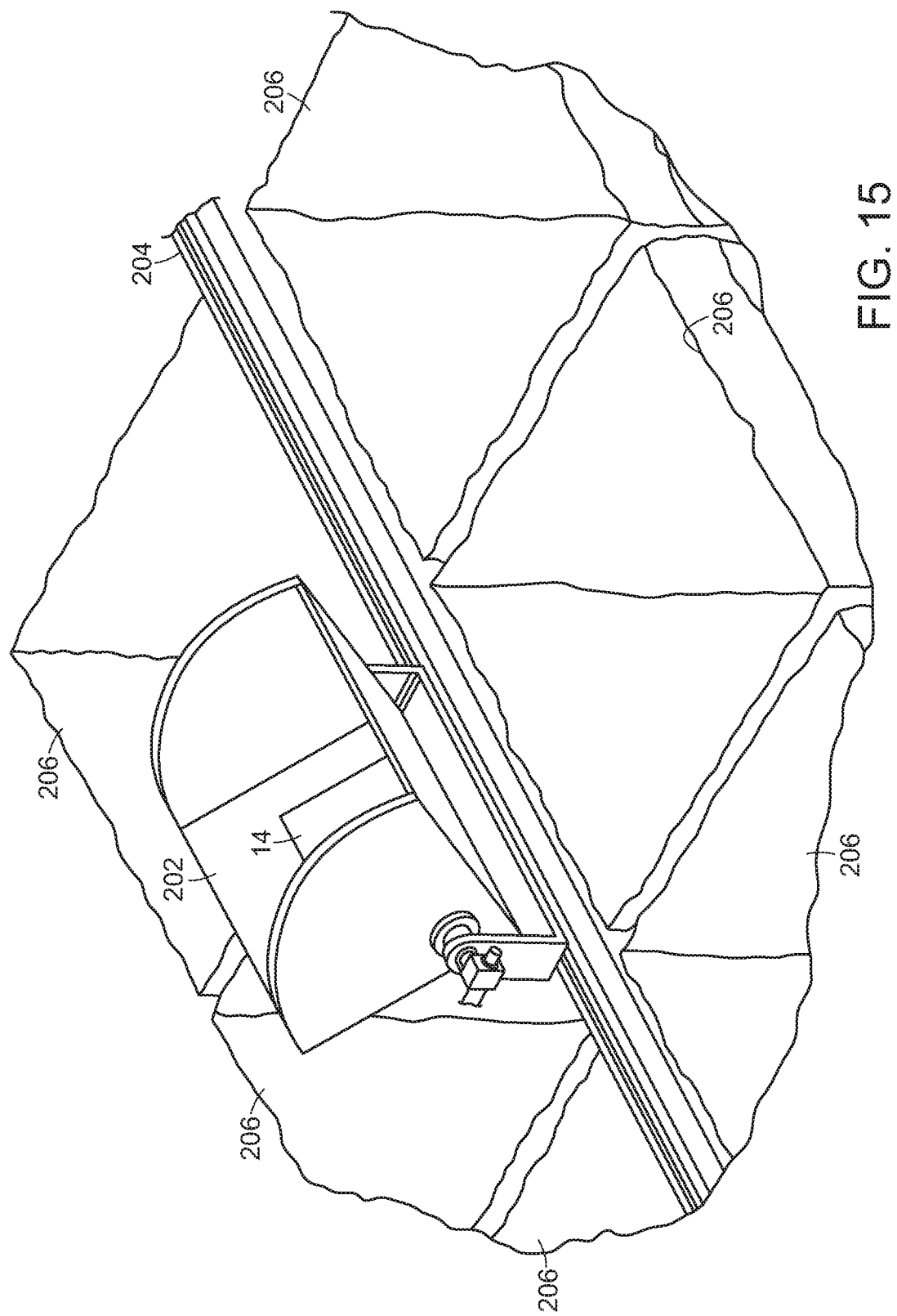
FIG. 15 shows an illustrative diagrammatic view of the carriage on the track adjacent bins in the shuttle section shown in FIG. 14.
Figure 16:
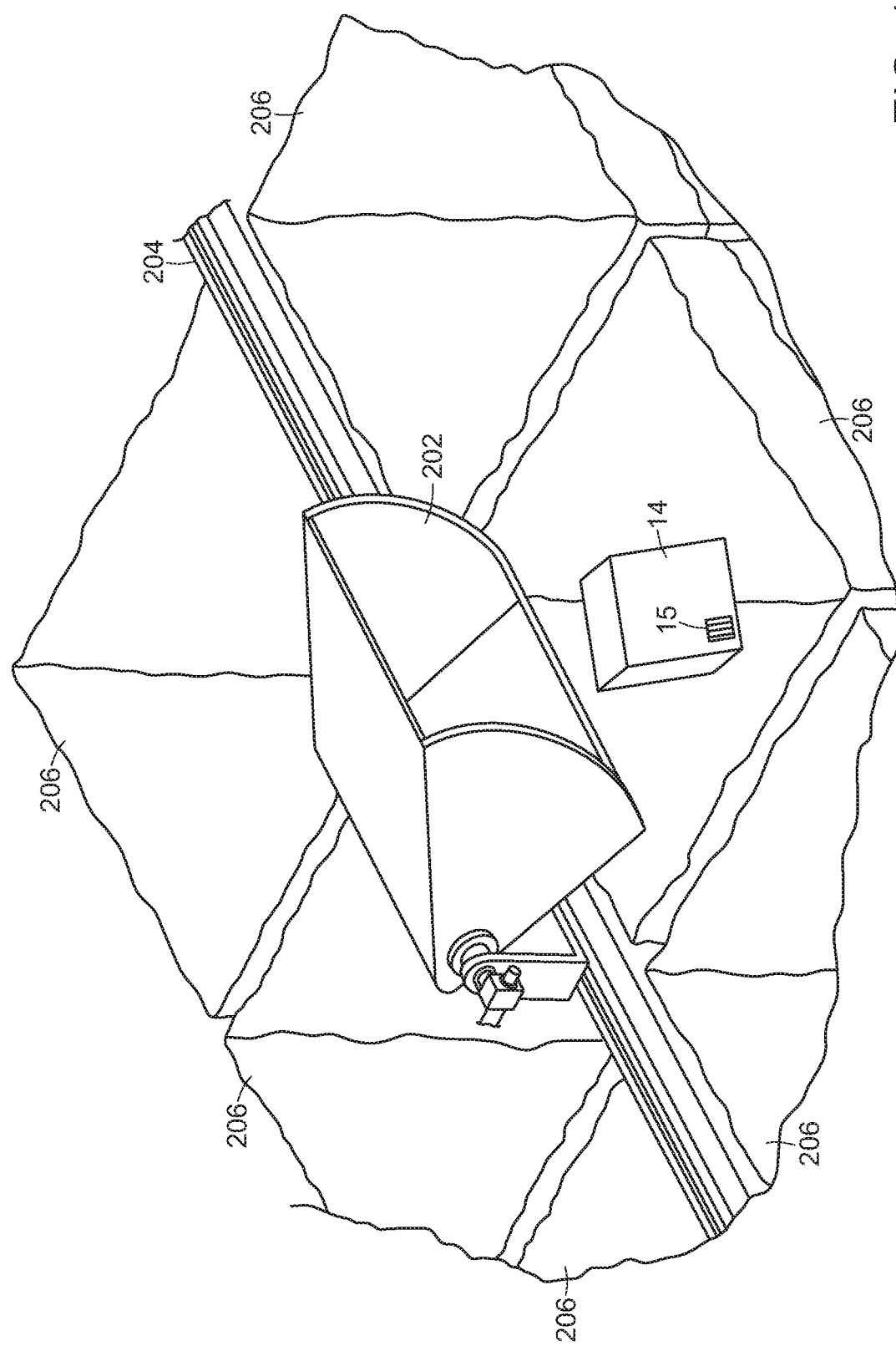
FIG. 16 shows an illustrative diagrammatic view of the carriage of FIG. 15 dropping its contents into a bin in the shuttle section of FIG. 14.

In accordance with further embodiments of the invention and as shown in FIG. 14, a system of the invention may include a track 102 along which carriages 100 may travel in one direction past a plurality of processing bins 104. The remaining items of the system having reference numerals in common with the system of FIG. 1 are the same as those of the system of FIG. 1. Each carriage 100 may be dynamically programmed to dump its contained object 14 into an assigned processing bin 104 based on an assigned sortation scheme. As further shown in FIGS. 15 and 16, the carriage 100 travels along the track 102 and carries objects to a desired processing bin, and tilts, dropping the object 14 into the desired destination bin as shown in FIG. 16.

FIG. 14 shows a processing system 200 similar to that of systems 100, 100' (with similar element bears similar reference numerals), except that the system 200 includes carriages 202 that ride along a track (e.g., a circular track). When a carriage 202 is positioned below the drop scanner 34, an object falls through the scanner and is identified as discussed above. The carriage 202 is then moved between rows of bins 206, each of which may include, for example a pre-placed bag. With further reference to FIGS. 15 and 16, when the carriage 202 is moved to a desired processing location, the carriage stops (or slows), and dumps the object 14 into the bin 206 (as shown in FIG. 16) similar to the action of carriage 80 discussed above. Again, the object 14 may include indicia 15 such as a barcode that was detected by the scanner 34.

Figure 17:
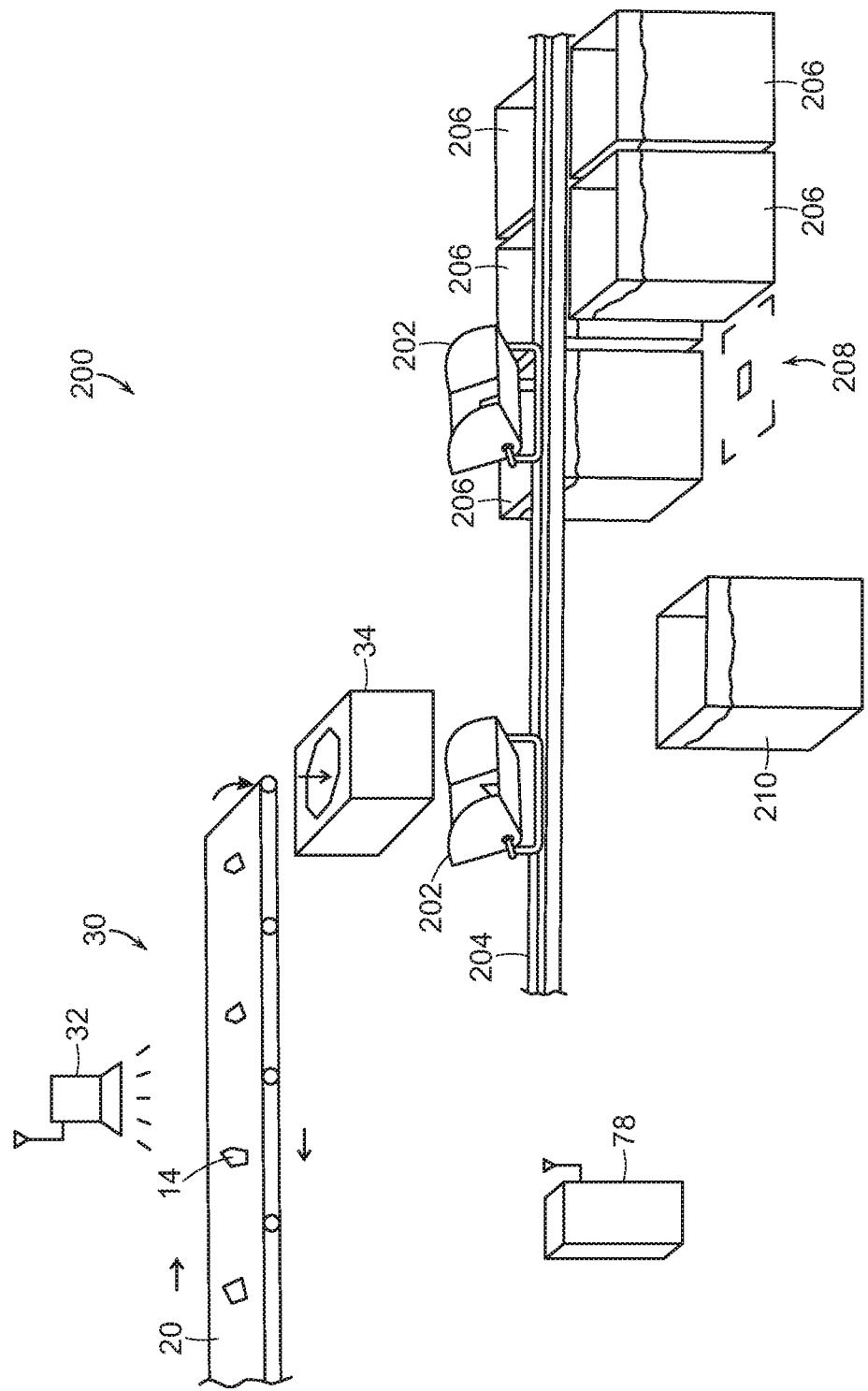
FIG. 17 shows an illustrative diagrammatic view of the system of FIG. 14 while a bin is being replaced.

As further shown in FIG. 17, when a bins 206 is full (e.g., by sensors as discussed above, or by the system knowing how many items are in the bin, or by having a human simply decide that a bin is full) a human may then pick up the bin 206. Upon removing the bin 206, a sensor system 208 under the bin will indicate that the bin (that specific bin) has been removed. The system may continue processing other bins, but will know not to sort to the removed bin. A new empty bin 210 may then be replaced on the opened location. Because the assignment of bin processing locations is dynamic and flexible, no further registration is required. As soon as the bin 210 is placed on the sensor 208, the system will know that there is a new unassigned bin ready for dynamic processing as discussed further below.

In accordance with various embodiments therefore, a system may provide that a portion of the input stream is selectively adjusted by the robotic arm to provide a singulated stream of objects (as may be detected and confirmed by a perception unit). In particular objects are identified by the primary perception unit 22 as being selected for removal (simply to provide a singulated stream of objects), and the robotic arm 24 is engaged to selectively remove objects from the input stream to create the singulated stream of objects. In further embodiments, diverters as discussed above may be used for this purpose. The removed objects are placed by the robotic arm onto a return chute 96 that returns the selected objects to the input bin. Such recirculation is for the purpose of providing the singulated stream of objects. Significantly, a singulated stream of objects is provided, and this singulated stream of objects may be delivered to a perception unit (as discussed above) as a singulated stream without requiring that a robotic system place objects into the perception unit. If an object is not identified or is otherwise not able to be processed, it may fall to an exception bin 38 as discussed above, and either returned to a recirculation area or hand processed by a person.

The assignment of processing bins may also be dynamic. For example, systems in accordance with further embodiments, provide improved transport and conveyor systems to provide a singulated stream of objects, and to provide dynamically changing patterns of object handling, with resulting efficiencies in the sortation process, lower space requirements, lower demand for manual operations, and as a consequence, lower capital and operating costs for the entire system.

During use, the sorting station may select an object and then identify the selected object by the perception system 22 (or may detect an identity of an object using a scanner on the articulated arm, or may use the robotic arm to move the object to a detection device). In further embodiments, the robotic arm may even hold an object in the perception system 28 for object identification only. If the object has an assigned bin or a new bin is available, then the end effector will drop the object through the perception system; otherwise the robotic arm will pull the object from the perception system 28 and place it on the return chute 96. The system assigns a bin to the object if a new bin is available and the object is not yet assigned a bin at that sorting station. What is significant is that the sorting station is not pre-assigned a large set of collection bins assigned to all possible objects that may appear in the input path. Further, the central controller may employ a wide variety of heuristics that may further shape the process of dynamically assigning objects to collection bins as discussed in more detail below. Once bins are either filled or otherwise completed, the completed bins are signaled as being done and ready for further processing (e.g., by lights 72 associated with bin 90, 92 in FIG. 10).

Figure 18:
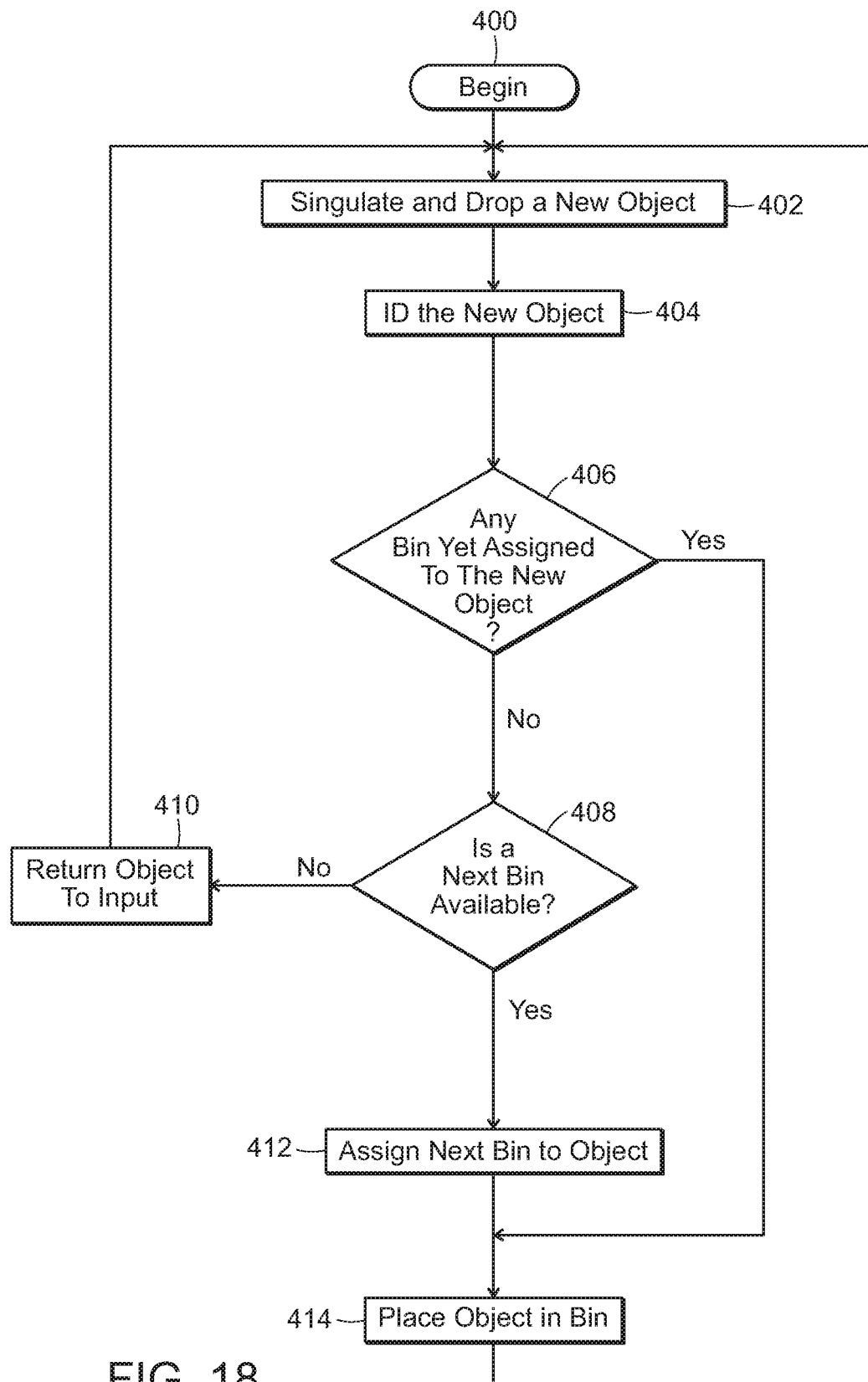
FIG. 18 shows an illustrative diagrammatic view of a flowchart showing selected processing steps in a system in accordance with an embodiment of the present invention.

As shown in FIG. 18, a sortation process of the invention at a sorting station may begin (step 400) by providing a singulated stream of objects that, one at a time, drop an object into the drop scanner (step 402). The system then identifies the new object (step 404). The system then will determine whether the object is yet assigned to any collection bin (step 406). If not, the system will determine whether a next bin is available (step 408). If no next bin is available (step 410), the robotic system will return the object to the input buffer (step 410) and return to step 402. Alternatively, the system can pick one of the collection bins that is in process and decide that it can be emptied to be reused for the object in hand, at which point the control system can empty the collection bin or signal a human worker to do it. If a next bin is available (and the system may permit any number of bins per station), the system will then assign the object to a next bin (step 412). The system then places the object into the assigned bin (step 414). The system then returns to step 402 until finished. Again, in certain embodiments, the secondary conveyor may be an indexed conveyor that moves in increments each time an object is dropped onto the conveyor. The system may then register the identity of the object, access a warehouse manifest, and determine an assigned bin location or assign a new bin location.

Figure 19:
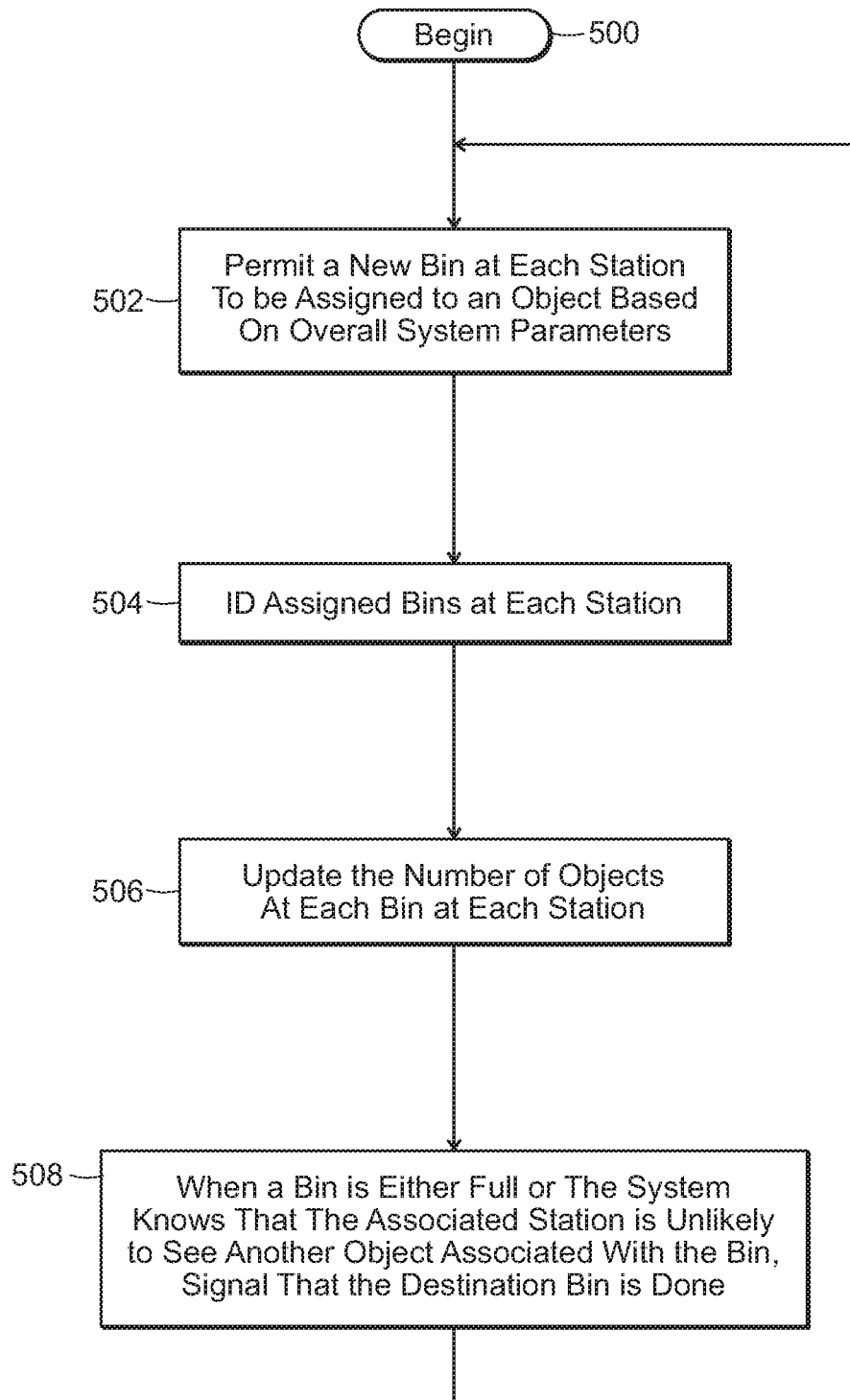
FIG. 19 shows an illustrative diagrammatic view of a flowchart showing bin assignment and management steps in a system in accordance with an embodiment of the present invention.

A process of the overall control system is shown, for example, in FIG. 19. The overall control system may begin (step 500) by permitting a new collection bin at each station to be assigned to a group of objects based on overall system parameters (step 502) as discussed in more detail below. The system then identifies assigned bins correlated with objects at each station (step 504), and updates the number of objects at each bin at each station (step 506). The system then determines that when a bin is either full or the system expects that the associated sorting station is unlikely to see another object associated with the bin, the associated sorting station robotic system will then place the completed bin onto an output conveyor, or signal a human worker to come and empty the bin (step 508), and then return to step 502.

Systems of various embodiments provide numerous advantages because of the inherent dynamic flexibility. The flexible correspondence between sorter outputs and destinations provides that there may be fewer sorter outputs than destinations, so the entire system may require less space. The flexible correspondence between sorter outputs and destinations also provides that the system may choose the most efficient order in which to handle objects, in a way that varies with the particular mix of objects and downstream demand. The system is also easily scalable, by adding sorters, and more robust since the failure of a single sorter might be handled dynamically without even stopping the system. It should be possible for sorters to exercise discretion in the order of objects, favoring objects that need to be handled quickly, or favoring objects for which the given sorter may have a specialized gripper.

In accordance with certain embodiments, therefore, the system provides a sortation system that employs a buffer at the infeed stage enabling scalable and flexible induction of objects into the system. The buffer may include a single conveyor, a circulating conveyor or multiple conveyors, possibly to separate disorganized objects from organized objects. In further embodiments, the invention provides a sortation system employing a plurality of sorters flexibly connected to both upstream and downstream processes. The system may also employ a flexible destination stage, including a process for dynamically changing the correspondence of sorter outputs and system destinations using a switch based on heuristics from the sortation process. The system may dynamically map sorter outputs to system destinations based on long-term historical usage trends and statistics, or items already processed, or current contents of other dynamically allocated sorter outputs, or average, minimum or maximum time-to-sort associated with each sorter output, or physical characteristics of the items sorted, or a priori information, or known future deliveries, or location within a facility, including the physical location relative to other allocated sorter outputs (e.g., above, beside, on or nearby), or incoming shipments, as well as knowing what items are currently upstream of the sortation process and combinations of the above. Further, systems of embodiments of the invention provide that information regarding correspondence between sorter outputs to system destinations may be provided to an automated system for sorting.

By making use of heuristics, the mapping of sorter outputs to system destinations can be improved substantially over traditional fixed allocation. Destinations may be assigned on the fly, reducing wasted space from unused sorter outputs and decreasing the time it takes to process incoming objects. Long-term historic trends may be used to allocate sorter outputs when the next incoming group of objects is either in-part or entirely unknown. Historical usage patterns provide insight into when objects bound for certain destinations can be expected to arrive, the number of objects bound for each destination expected for any given time, and the probable physical properties of these incoming objects.

The system provides in a specific embodiment an input system that interfaces to the customer's conveyors and containers, stores parcels for feeding into the system, and feeds those parcels into the system at a moderate and controllable rate. In one embodiment, the interface to the customer's process takes the form of a Gaylord dumper, but many other embodiments are possible. In one embodiment, feeding into the system is achieved by an inclined cleated conveyor with overhead baffles. A key to the efficient operation of the system is to feed parcels in at a modest controlled rate. Many options are available, including variations in the conveyor slope and speed, the presence, size and structure of cleats and baffles, and the use of sensors to monitor and control the feed rate.

The system includes in a specific embodiment a primary perception system that monitors the stream of parcels on the primary conveyor. Where possible the primary perception system may identify the parcel to speed or simplify subsequent operations. For example, knowledge of the parcels on the primary conveyor may enable the system to make better choices on whether to pick up a parcel rather than let it pass to the exception bin, which parcels to pick up first, or on how to allocate output bins. The main job of the primary perception system is to assist in providing a singulated stream of objects.

As also discussed above, the system includes in a specific embodiment a drop scanner that scans objects dropped through it, reads bar codes, confirms that an object is correctly singulated, and obtains the desired processing bin. Other embodiments are possible, including use of a conventional scan tunnel, or relying entirely on primary perception to identify objects. Another embodiment would include a recirculating primary conveyor, in which objects not identified on the first pass might be recirculated, perhaps by falling back into the infeed.

The systems therefore, include in certain embodiments a primary transport system that transports singulated and identified parcels towards the output. In one embodiment the primary transport is a conveyor belt with dividers to preserve singulation. The conveyor belt is indexed one position at a time, positioning parcels for transfer to a secondary transport system. Parcels are transferred by a diverter which pushes them across the conveyor to the secondary transport. When a singulation or identification failure occurs, the parcel remains on secondary transport and falls into the secondary exception bin. Other embodiments are possible, for example a cross-belt system, a sliding shoe diverter system, or a tilt-tray system.

The system also includes in a specific embodiment a secondary transport system which carries parcels to the processing bins. In one embodiment the secondary transport is a reciprocating shuttle which travels linearly along the tops of two rows of bins, then tilts to one side or the other to drop the parcel into the desired bin, and then returns to a home position ready to receive another parcel. Other embodiments are possible, for example a tilt-tray system, a cross-belt system, or a shoe diverter system.

The system includes means to interface to the customer's outgoing parcel conveyance systems. In a specific embodiment the bins are lined with bags. When the bin is full as determined by sensors or by monitoring system operation, a human operator pulls the bin out of place, removes the bag, labels the bag, and places the bag on an appropriate conveyor. Other embodiments are possible, including automatic bagging systems, bins without bags, bins that are automatically ejected from the system and replace with new bins. In one embodiment the system continues operation during the bagging operation by avoiding induction of parcels destined for that particular bin, or by allocating a different bin for the same destination.

In accordance with a specific embodiment, the invention provides a user interface that conveys all relevant information to operators, management, and maintenance personnel. In a specific embodiment this may include lights indicating bins that should be bagged, lights indicating bins not completely returned to position, lights indicating operational status, displays for monitoring the operation of the primary perception system and the drop scanner, displays monitoring grasping and robot motion, monitoring of exception bin levels and input hopper level, and operating mode of the entire system. Additional information included might be rate of parcel processing and additional statistics such as exception and error rates. In a specific embodiment the system automatically prints bag labels and scans bag labels before the operator places them on the output conveyor.

In accordance with a further embodiment, a system of the invention incorporates software systems that interface with the customer's databases and other information systems, to provide operational information to the customer's system and to query the customer's system for parcel information.

The invention has many variations possible to suit the varying characteristics of the task. The number of bins serviced by a shuttle may be greater or lesser. The number of shuttles may be increased. In some embodiments there may be more than one secondary transport system, serving additional sets of shuttles. In other embodiments there may be more than one robot.

Some applications may not justify the use of a robot, and one embodiment would then use a human to perform induction. In another embodiment, the system might include a conventional unit sortation conveyor such as a tilt-tray or cross belt sorter, with the robot performing induction.

In accordance with various embodiments, therefore, the invention provides a robotic system for sorting parcels to desired output destination bins. The system includes an input system for accepting parcels from the customer and feeding them into the system; a singulation system to transform the stream of parcels into a sequence of discrete parcels; an identification system to read identifying marks or otherwise determine the desired destination; and an output system for conveying each parcel to a desired processing bin, from which it can be conveyed to the customer's desired destination.

In further embodiments, the infeed system includes an inclined conveyor with cleats, the infeed system includes an inclined conveyor with baffles, and/or the infeed system includes a sensor to monitor parcel stream height, breadth or rate, so that the conveyor rate may be modulated to control parcel rate. In accordance with further embodiments, the singulation system includes a primary perception system to monitor parcels.

In accordance with certain embodiments, the primary perception system may determine parcel identity, may determine grasp locations, and/or may determine parcel class. In accordance with further embodiments, the singulation system may include one or more robotic manipulators with grippers, and one or more of the grippers is a vacuum gripper, the vacuum gripper may be equipped with a pressure sensor, and/or one or more of the grippers may be equipped with a force sensor. In accordance with further embodiments, the singulation system may include one or more robotic manipulators with end effectors suited to pushing, and the identification system may include one or more parcel scanners to identify parcels, e.g., a drop scanner.

In accordance with certain embodiments, the output system includes one or more conveyors which combine to transfer parcels to bins, the conveyors are organized as one or more primary conveyors; with each primary conveyor transferring parcels to one or more secondary conveyors, and/or one or more primary conveyors is a cleated conveyor capable of indexing one position at a time. In accordance with further embodiments, diverters transfer parcels from the primary conveyors to secondary conveyors, the diverters are linear actuators attached to sweeper diverters, one or more of the conveyors is a reciprocating shuttle, and/or the reciprocating shuttle includes a tilt axis to drop parcels.

In accordance with further embodiments, the invention provides a method for automatically sorting parcels and conveying parcels to desired output destinations. The method includes the steps of feeding the customer parcels into the system infeed, conveying the parcels from the system infeed to a singulation system, singulating the parcels and moving them to an identification system, identifying the parcels and their associated desired destinations, and conveying each parcel to a desired destination.

In accordance with further embodiments, the infeed conveyor's design and control are optimized to present the parcels in a stream best suited to subsequent perception and handling, grasp points are determined automatically, grasp points are determined from computer vision algorithms, and/or singulation is accomplished by grasping single parcels and moving them individually to subsequent processing. In accordance with further embodiments, sensor information is used to estimate grasp state including contact with parcel, quality of vacuum seal, parcel weight, parcel mass distribution, and parcel position relative to gripper, and/or grasp state estimates are used to determine whether the grasp is adequate, and to modulate the subsequent motion to avoid drops. In accordance with further embodiments, the robot arm's motion is determined by motion planning software cognizant of initial and final waypoints, surrounding obstacles, and constraints necessary to maintain a secure grasp and/or the correspondence of output bins to customer destinations are determined dynamically to optimize system throughput.

Those skilled in the art will appreciate that numerous modifications and variations may be made to the above disclosed embodiments without departing from the spirit and scope of the present invention.

What is claimed is:

1. An object processing system comprising:
an input source area providing objects to be sorted;
an input conveying system for moving the objects to be sorted to a primary conveying system source area;
a primary conveying system including the primary conveying system source area and a primary conveyor for moving the objects to be sorted from the primary conveying system source area along a primary conveyor direction;
a detection and selection system including at least one perception unit and at least one computer processing system for detecting objects on the primary conveyor, and for selecting certain selected objects for removal from the primary conveyor;
removal means for removing the certain selected objects from the primary conveyor for providing a singulated stream of objects in the primary conveyor direction, wherein the removal means provides that the certain selected objects are returned to the input source area; and
a secondary conveying system positioned below an end of the primary conveyor, the secondary conveying system including a carriage that moves reciprocally along a track between two rows of destination bins,
wherein the singulated stream of objects are dropped one at a time from the primary conveyor into the carriage of the secondary conveying system that delivers the object to one of the destination bins.

2. The object processing system as claimed in claim 1, wherein the input conveying system moves the objects to be sorted in a direction that is at least partially upward.

3. The object processing system as claimed in claim 1, wherein the input source area includes an input hopper and the input conveying system includes a cleated conveyor that moves objects from the input hopper to the primary conveying source area.

4. The object processing system as claimed in claim 1, wherein the removal means includes a robotic arm and an end effector for acquiring the certain selected objects.

5. The object processing system as claimed in claim 1, wherein the removal means includes an urging member for urging the certain selected object from the primary conveyor.

6. The object processing system as claimed in claim 5, wherein the urging member is a push member for pushing the certain selected object from the primary conveyor.

7. The object processing system as claimed in claim 5, wherein the urging member is a pull member for pulling the certain selected object from the primary conveyor.

8. The object processing system as claimed in claim 1, wherein the removal system includes a chute that leads back toward the input source area.

9. The object processing system as claimed in claim 1, further comprising a drop scanner, and wherein the primary conveyor leads to an area that is higher than the drop scanner, and wherein the singulated stream of objects are dropped one at a time from the primary conveyor, through the drop scanner, and into the carriage of the secondary conveying system.

10. An object processing system comprising:
an input source area providing objects to be sorted;
a conveyance system that includes an input conveyor and a primary conveyor, wherein the input conveyor moves the objects to be sorted from the input source area to a detection area on the primary conveyor of the conveyance system;
a detection and selection system including at least one perception unit at the detection area and at least one computer processing system for detecting objects at on the primary conveyor in the detection area, and for selecting certain selected objects for removal from the primary conveyor; and
removal means for removing the certain selected objects from the primary conveyor for providing a singulated stream of objects, wherein the removal means provides that the certain selected objects are returned to the input source area;
the conveyance system further including a secondary conveyor and a plurality of urging members disposed along a side of the secondary conveyor, and
a plurality of shuttle sections positioned along an opposing side of the secondary conveyor, each shuttle section including a carriage that moves reciprocally along a track between two rows of destination bins, and
wherein the singulated stream of objects are dropped one at a time from the primary conveyor onto the secondary conveyor, and wherein one of the plurality of urging members pushes an object from the secondary conveyor into the carriage of the at least one shuttle section to deliver the object to one of the destination bins.

11. The object processing system as claimed in claim 10, wherein the input conveyor of the conveyance system moves the objects to be sorted in a direction that is at least partially upward.

12. The object processing system as claimed in claim 10, wherein the input source area includes an input hopper and the input conveyor of the conveyance system includes a cleated conveyor that moves objects from the input hopper to the primary conveyor of the conveyance system.

13. The object processing system as claimed in claim 10, wherein the removal means includes a robotic arm and an end effector for acquiring the certain selected objects.

14. The object processing system as claimed in claim 10, wherein the removal means includes an urging member for urging the certain selected object from the primary conveyor.

15. The object processing system as claimed in claim 14, wherein the urging member is a push member for pushing the certain selected object from the primary conveyor.

16. The object processing system as claimed in claim 14, wherein the urging member is a pull member for pulling the certain selected object from the primary conveyor.

17. The object processing system as claimed in claim 10, wherein the removal system includes a chute that leads back toward the input source area.

18. The object processing system as claimed in claim 10, wherein the object processing system further includes a drop scanner, and wherein the primary conveyor leads to an area that is higher than the drop scanner.

19. The object processing system as claimed in claim 18, wherein the singulated stream of objects are dropped one at a time from the primary conveyor, through the drop scanner, and onto the secondary conveyor.

20. The object processing system as claimed in claim 10, wherein the plurality of shuttle sections extend perpendicular to the secondary conveyor.

21. The object processing system as claimed in claim 10, wherein the plurality of shuttle sections extend in parallel with the secondary conveyor.

22. The object processing system as claimed in claim 10, wherein the carriage moves along the track of the shuttle section to return to the secondary conveyor after delivering the object to the destination bin.

23. The object processing system as claimed in claim 10, wherein the carriage tilts towards the destination bin in one of the two rows of destination bin to drop the object into the destination bin.

24. An object processing system comprising:
an input source area providing objects to be sorted;
a conveyance system for moving the objects to be sorted from the input source area to a detection area on a primary conveyor of the conveyance system;
a detection and selection system including at least one perception unit at the detection area and at least one computer processing system for detecting objects at on the primary conveyor in the detection area, and for selecting certain selected objects for removal from the primary conveyor;
removal means for removing the certain selected objects from the primary conveyor for providing a singulated stream of objects; and
a drop scanner, and wherein the primary conveyor leads to an area that is higher than the drop scanner.

25. The object processing system as claimed in claim 24, wherein the conveyance system includes an input conveyor that moves the objects to be sorted in a direction that is at least partially upward.

26. The object processing system as claimed in claim 24, wherein the input source area includes an input hopper and the conveyance system includes a cleated conveyor that moves objects from the input hopper to a primary conveyor of the conveyance system.

27. The object processing system as claimed in claim 24, wherein the removal means includes a robotic arm and an end effector for acquiring the certain selected objects.

28. The object processing system as claimed in claim 24, wherein the removal means includes an urging member for urging the certain selected object from the primary conveyor.

29. The object processing system as claimed in claim 28, wherein the urging member is a push member for pushing the certain selected object from the primary conveyor.

30. The object processing system as claimed in claim 28, wherein the urging member is a pull member for pulling the certain selected object from the primary conveyor.

31. The object processing system as claimed in claim 24, wherein the removal system includes a chute that leads back toward the input source area.

32. The object processing system as claimed in claim 24, wherein the drop scanner is positioned above a secondary conveyor.

33. The object processing system as claimed in claim 24, wherein the processing system further includes a plurality of destination areas along the secondary conveyor, as well as a plurality of urging members for urging objects on the secondary conveyor toward assigned destination areas.

34. The object processing system as claimed in claim 24, wherein the drop scanner obtains identifying indicia from each object dropped through the drop scanner.

35. The object processing system as claimed in claim 24, wherein the drop scanner comprises a structure having a top opening and a bottom opening and a plurality of perception units positioned about the structure, wherein the singulated stream of objects are dropped one at a time from the primary conveyor through the secondary perception system, and wherein the plurality of perception units obtain identifying indicia for each object dropped through the secondary perception system.

36. The object processing system as claimed in claim 35, wherein the plurality of perception units includes a camera, a scanner, or a combination of cameras and scanners.

* * * * *